(12) United States Patent
Chen et al.

(10) Patent No.: US 12,116,208 B2
(45) Date of Patent: Oct. 15, 2024

(54) INTELLIGENT WAREHOUSING SYSTEM, METHOD FOR FETCHING MATERIAL AND BACKGROUND PROCESSING TERMINAL THEREOF

(71) Applicant: HAI ROBOTICS CO., LTD., Guangdong (CN)

(72) Inventors: Yuqi Chen, Guangdong (CN); Jui-Chun Cheng, Guangdong (CN); Hongxia Zhou, Guangdong (CN); Xin Ai, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 93 days.

(21) Appl. No.: 18/067,905

(22) Filed: Dec. 19, 2022

(65) Prior Publication Data

US 2023/0121672 A1  Apr. 20, 2023

Related U.S. Application Data

(63) Continuation of application No. 17/379,956, filed on Jul. 19, 2021, now Pat. No. 11,565,882, which is a
(Continued)

(30) Foreign Application Priority Data

Jan. 21, 2019 (CN) ......................... 201910054856.X
Jan. 21, 2019 (CN) ......................... 201920101241.3

(51) Int. Cl.
*G06F 7/00* (2006.01)
*B65G 1/137* (2006.01)
(Continued)

(52) U.S. Cl.
CPC ......... *B65G 1/1373* (2013.01); *B65G 1/1371* (2013.01); *G05D 1/0217* (2013.01);
(Continued)

(58) Field of Classification Search
CPC .. B65G 1/1373; B65G 1/1371; B65G 1/0492; G05D 1/0217; G05D 1/0297;
(Continued)

(56) References Cited

U.S. PATENT DOCUMENTS 9,592,759 B1  3/2017 Theobald
10,138,060 B1  11/2018 Mantha et al.
(Continued)

FOREIGN PATENT DOCUMENTS

CN  106379681 A  2/2017
CN  206885961 U  1/2018
(Continued)

OTHER PUBLICATIONS

International search report of PCT/CN2020/073624; mailed Apr. 24, 2020.

*Primary Examiner* — Yolanda R Cumbess
(74) *Attorney, Agent, or Firm* — Frank Gao, Esq.

(57) ABSTRACT

An intelligent warehousing system, a material fetching and placing method and a processing terminal thereof, where the intelligent warehousing system includes a first warehousing robot and a second warehousing robot, the first warehousing robot is configured to receive a first scheduling instruction, move to a fixed shelf to fetch and place a material box according to the first scheduling instruction, and handle the material box to a first target position; and the second warehousing robot is configured to receive a second scheduling instruction, move to a portable shelf according to the second scheduling instruction, and handle the portable shelf to a second target position. Through the technical solution of the present application, compatibility of the intelligent warehousing system is improved, which may be applied to a warehouse with different shelves, thus improving the utilization rate of the warehouse.

13 Claims, 11 Drawing Sheets

Related U.S. Application Data continuation of application No. PCT/CN2020/073624, filed on Jan. 21, 2020.

(51) Int. Cl.
    *G05D 1/00*        (2006.01)
    *G06Q 10/0631*    (2023.01)
    *G06Q 10/087*     (2023.01)

(52) U.S. Cl.
    CPC ..... *G05D 1/0297* (2013.01); *G06Q 10/06316* (2013.01); *G06Q 10/087* (2013.01)

(58) Field of Classification Search
    CPC  G06Q 10/06316; G06Q 10/087; B66F 9/063; B66F 9/065
    USPC .......................................... 700/213–216, 228
    See application file for complete search history.

(56) References Cited

U.S. PATENT DOCUMENTS

| | | | |
|---|---|---|---|
| 2013/0173049 A1* | 7/2013 | Brunner | G06Q 10/08 700/216 |
| 2015/0073589 A1 | 3/2015 | Khodl et al. | |
| 2016/0132059 A1 | 5/2016 | Mason et al. | |
| 2017/0336780 A1 | 11/2017 | Wise et al. | |
| 2018/0127212 A1* | 5/2018 | Jarvis | B60P 1/02 |
| 2018/0265297 A1 | 9/2018 | Nakano et al. | |
| 2018/0305122 A1 | 10/2018 | Moulin et al. | |

FOREIGN PATENT DOCUMENTS

| | | | | |
|---|---|---|---|---|
| CN | 107814126 A | * | 3/2018 | ............... B65G 1/04 |
| CN | 108137232 A | | 6/2018 | |
| CN | 108551192 A | | 9/2018 | |
| CN | 108557363 A | | 9/2018 | |
| CN | 108698758 A | | 10/2018 | |
| CN | 109160169 A | | 1/2019 | |
| CN | 109230148 A | | 1/2019 | |
| CN | 109592280 A | | 4/2019 | |
| CN | 209758194 U | | 12/2019 | |
| JP | 8119419 A | | 5/1996 | |
| JP | 2008179451 A | | 8/2008 | |
| JP | 2009541175 A | | 11/2009 | |
| JP | 201539767 A | | 3/2015 | |
| JP | 2017141102 A | | 8/2017 | |
| JP | 201820423 A | | 2/2018 | |
| JP | 2018043832 A | | 3/2018 | |
| JP | 2019511437 A | | 4/2019 | |
| JP | 2020500799 A | | 1/2020 | |
| WO | WO2016130849 A1 | | 8/2016 | |
| WO | WO2016151504 A1 | | 9/2016 | |
| WO | WO2018237112 A1 | | 12/2018 | |

* cited by examiner

INTELLIGENT WAREHOUSING SYSTEM, METHOD FOR FETCHING MATERIAL AND BACKGROUND PROCESSING TERMINAL THEREOF

CROSS-REFERENCE TO RELATED APPLICATIONS

This application is a continuation of application Ser. No. 17/379,956, filed on Jul. 19, 2021, which claims priority to Chinese Patent Application No. 201910054856.X, filed on Jan. 21, 2019, and Chinese Patent Application No. 201920101241.3, filed on Jan. 21, 2019. All of the aforementioned patent applications are hereby incorporated by reference in their entireties.

TECHNICAL FIELD

The present application relates to the field of intelligent warehousing, in particular to an intelligent warehousing system, a method for fetching a material, and a background processing terminal thereof.

BACKGROUND

With the rise and development of e-commerce and online shopping, it has brought great development opportunities to the intelligentization of warehousing logistics of materials. In recent years, technologies of moving a material based on a warehousing robot have become increasingly mature. In the prior art, a warehousing robot may lift a rack containing a material through a lift round plate on a top of the warehousing robot, and move by scanning a two-dimensional code on the ground, so that a rack where an ordered material is located can be moved to a manual processing area.

In a process of implementing the present application, the inventor finds that the related technologies have the following defects: since a moving object of the warehousing robot is a rack with a material stored, there is a certain limit on the height of the rack; otherwise, there is a risk of dumping. At the same time, due to the limited height of the rack, space of the warehouse cannot be fully utilized, resulting in a low utilization rate of the warehouse.

SUMMARY

Embodiments of the present application provides an intelligent warehousing system, which improves the flexibility of the intelligent warehousing system by providing different types of warehousing robots for fetching a material, and may be applied to a warehouse with different racks, thus improving the utilization rate of the warehouse.

The present application provides an intelligent warehousing system, where the intelligent warehousing system includes at least one first warehousing robot, at least one second warehousing robot, at least one fixed rack, and at least one portable rack. The at least one fixed rack is configured to store a first material box, and the first material box is configured to store a first material. The at least one portable rack is configured to store a second material, and each of the at least one portable rack is located within a lower space of each of the at least one fixed rack to form a combined rack.

Where the at least one first warehousing robot is configured to receive a first scheduling instruction, move to the at least one fixed rack to fetch the first material box according to the first scheduling instruction, and move the material box to a first target position; and the at least one second warehousing robot is configured to receive a second scheduling instruction, move to the at least one portable rack according to the second scheduling instruction, and move the at least one portable rack to a second target position.

In an implementation manner, the at least one fixed rack is further configured to store a first pallet, where the first pallet is configured to hold a third material or a third material box storing a fourth material; and the at least one portable rack is further configured to store a fourth material box storing a fifth material or a second pallet, where the second pallet is configured to hold a sixth material or a fifth material box storing a seventh material.

In an implementation manner, the warehousing system includes a plurality of fixed racks and a plurality of portable racks, where the plurality of fixed racks are located at different positions in a same area, and the plurality of portable racks are located at different positions in a same area.

In an implementation manner, each of the at least one first warehousing robot includes a mobile chassis, a picking component, a lift component, and a storage rack, where the storage rack is configured to store the first material box that has been picked by the picking component from the at least one fixed rack.

In an implementation manner, the intelligent warehousing system further includes: a processing terminal, where the processing terminal is configured to send at least one of the first scheduling instruction and the second scheduling instruction. The first scheduling instruction is used to instruct the at least one first warehousing robot to fetch the first material box from the at least one fixed rack, and the second scheduling instruction is used to instruct the at least one second warehousing robot to move the at least one portable rack.

In an implementation manner, the processing terminal stores material storage association information, and the material storage association information includes at least one of the following information:

material identification information, material box identification information, rack identification information, position information of a rack for storing a material, position information of a material box for storing a material, a corresponding relationship between racks and material boxes, a corresponding relationship between racks and materials, a corresponding relationship between material boxes and materials.

In an implementation manner, the processing terminal is specifically configured to:

obtain information of a material to be fetched, and determine a position of the material to be fetched and placed based on the information of the material to be fetched and the material storage association information;

send, based on the position of the material to be fetched, the first scheduling instruction to instruct the at least one one first warehousing robot to move to the at least one fixed rack to fetch the material to be fetched; or, send the second scheduling instruction to instruct the at least one second warehousing robot to move to the at least one portable rack to fetch the at least one portable rack that is storing the material to be fetched.

An embodiment of the present application provides a method for fetching a material, which is applied to a processing terminal. The processing terminal is applied to an intelligent warehousing system. The intelligent warehousing system includes at least one first warehousing robot, at least one second warehousing robot, at least one first fixed rack, at least one second fixed rack, at least one first portable rack, and at least one second portable rack. The at least one second fixed rack is configured to store a first material box, and the first material box is configured to store a first material. The at least one second portable rack is configured to store a second material, and each of the at least one second portable rack is located within a lower space of each of the at least one second fixed rack to form a combined rack. The method includes:

obtaining information of a material to be fetched;
performing, according to the information of the material to be fetched, at least one of following operations:
sending a first scheduling instruction to instruct the at least one first warehousing robot to move to the at least one second fixed rack to fetch the first material box, and move the first material box to a first target position, and sending a second scheduling instruction to instruct the at least one second warehousing robot to move to the at least one second portable rack, and move the at least one second portable rack to a second target position.

In an implementation manner, the method further includes:
storing material storage association information,
where the material storage association information includes at least one of the following information:
material identification information, material box identification information, rack identification information, position information of a rack for storing a material, position information of a material box for storing a material, a corresponding relationship between racks and material boxes, a corresponding relationship between racks and materials, a corresponding relationship between material boxes and materials.

In an implementation manner, the method further includes:
determining, based on the information of the material to be fetched, a container that is storing the material to be fetched, wherein the container is at least one of:
the first material box stored on the at least one second fixed rack, a fourth material box stored on the at least one second portable rack, and the at least one second portable rack.

In an implementation manner, the method further includes:
selecting the first warehousing robot to fetch the material to be fetched when the container is the first material box stored on the at least one second fixed rack; or
selecting the second warehousing robot to fetch the at least one second portable rack storing the material to be fetched when the container is: the fourth material box stored on the at least one second portable rack, or the at least one second portable rack.

In an implementation manner, the information of the material to be fetched includes: order information of the material to be fetched, and the determining the container storing the material to be fetched includes:
determining the container where the material to be fetched is located, based on the order information of the material to be fetched, and the material storage association information.

In an implementation manner, the at least one first portable rack is located at an aisle entrance, and the information of the material to be fetched includes order information of the material to be fetched;

where when the container where the material to be fetched is located is the first material box stored on the at least one second fixed rack, the first scheduling instruction for the at least one first warehousing robot further includes:
instructing the at least one first warehousing robot to move to the at least one second fixed rack of the combined rack where the material to be fetched is located, fetch the first material box from the at least one second fixed rack, and place the first material box on the at least one first portable rack at the aisle entrance; and
the second scheduling instruction for the at least one second warehousing robot further includes:
instructing the second warehousing robot to:
move the at least one second portable rack of the combined rack where the material to be fetched is located, or move the at least one first portable rack at the aisle entrance;
the method further includes:
determining whether it is necessary to move the first portable rack at the aisle entrance to perform a task, and when it is necessary to move the at least one first portable rack at the aisle entrance, instructing the at least one second warehousing robot to move the at least one first portable rack to a designated position.

In an implementation manner, the method further includes:
determining, based on the information of the material to be fetched, a type of the material to be fetched, the type of the material to be fetched includes at least one of: a first ordinary material, a second ordinary material, a large material, and a pendant material.

In an implementation manner, the first ordinary material is stored on the at least one second fixed rack, and the second ordinary material, the large material and the pendant material are stored on the at least one second portable rack; the method further including:
when the material to be fetched is the first ordinary material, selecting the first warehousing robot to fetch the material to be fetched; and
when the material to be fetched is the second ordinary material, the large material or the pendant material, selecting the second warehousing robot to fetch the at least one second portable rack storing the material to be fetched.

In an implementation manner, the method further includes:
determining, based on the information of the material to be fetched, a type of a rack storing the material to be fetched, where the type of the rack includes at least one of:
the at least one first fixed rack, the at least one first portable rack, the at least one second fixed rack, and the at least one second portable rack.

In an implementation manner, the method further includes:
selecting the first warehousing robot to fetch the material to be fetched when the type of the rack storing the material to be fetched is the at least one first fixed rack or the at least one second fixed rack; and
selecting the second warehousing robot to fetch a portable rack storing the material to be fetched when the type of the rack storing the material to be fetched is the at least one first portable rack or the at least one second portable rack.

In an implementation manner, the type of the rack storing the material to be fetched is the at least one second fixed rack, or the at least one second portable rack, and the information of the material to be fetched comprises order information of the material to be fetched, and the determining, based on the information of the material to be fetched, the type of the rack storing the material to be fetched includes:

querying storage association information of the material to be fetched based on the order information of the material to be fetched; and determining the type of the rack storing the material to be fetched based on the storage association information of the material to be fetched.

In an implementation manner, the at least one first portable rack is located at an aisle entrance, and the information of the material to be fetched comprises order information of the material to be fetched, the method further includes:

querying a type of the material to be fetched based on the order information of the material to be fetched, where the type of the material to be fetched includes at least one of: a first ordinary material, a second ordinary material, a large material, and a pendant material;

where the first ordinary material is stored on the at least one second fixed rack, and the second ordinary material, the large material and the pendant material are stored on the at least one second portable rack;

where the second scheduling instruction for instructing the at least one second warehousing robot further includes:

instructing the at least one second warehousing robot to fetch the at least one second portable rack when the material to be fetched is the second ordinary material, the large material, or the pendant material; and where the first scheduling instruction for instructing the at least one first warehousing robot to fetch the first material box further includes:

instructing the at least one first warehousing robot to fetch the first material box from the at least one second fixed rack, and place the first material box to a free first portable rack at the aisle entrance when the material to be fetched is the first ordinary material the method further includes:

determining whether it is necessary to move the first portable rack at the aisle entrance to perform a task, and when it is necessary to move the first portable rack at the aisle entrance, instructing the at least one second warehousing robot to move the at least one first portable rack from the aisle entrance to a designated position.

In an implementation manner, the method further includes:

determining a traveling route for the selected warehousing robot for material or rack fetching, based on the selected warehousing robot, and the material storage association information.

In an implementation manner, the method further includes:

selecting, based on current positions and working states of the at least one first warehousing robot, and the at least one second warehousing robot, the warehousing robot that performs the fetching with optimal efficiency, and has an optimal traveling route.

In an implementation manner, the traveling route includes a main road and an aisle, and the method further includes:

when there is a warehousing robot moving in the aisle, locking the aisle as an one-way street, or, when the first warehousing robot and the second warehousing robot move in the aisle at the same time, making the second warehousing robot to enter into a nearest first fixed rack to allow the first warehousing robot to move normally in the aisle, or, when there are more than two warehousing robots of a same type traveling in the aisle at the same time, determining a moving order of the warehousing robots according to a preset task priority.

Embodiments of the present application provides a processing terminal, which is characterized by including:

at least one processor; and, a memory, communicably connected with the at least one processor; where, the memory stores an instruction executable by the at least one processor, and the instruction is executed by the at least one processor to enable the at least one processor to execute the material fetching method described above.

An embodiment of the present application provides a non-transitory computer readable storage medium, where the non-transitory computer readable storage medium stores a computer executable instruction, and the computer executable instruction is used to enable a computer to execute the material fetching method described above.

An embodiment of the present application further provides a computer program product. The computer program product includes a computer program stored on a non-transitory computer readable storage medium. The computer program includes a program instruction which, when being executed by a computer, enables the computer to execute the material fetching method described above.

In the intelligent warehousing system provided by the embodiments of the present application, by a first warehousing robot receiving a first scheduling instruction, moving to a fixed rack to fetch a material according to the first scheduling instruction, and moving the material to a first target position, and a second warehousing robot being configured to receive a second scheduling instruction, moving to a portable rack according to the second scheduling instruction, and moving the portable rack to a second target position, flexibility of the intelligent warehousing system is improved, which may be applied to a warehouse with different racks, thus improving the utilization rate of the warehouse.

BRIEF DESCRIPTION OF DRAWINGS

One or more embodiments are illustrated by figures in the corresponding drawings, which does not constitute limitation to the embodiments. Elements with a same reference number in the drawings represent similar elements. Unless otherwise stated, the figures in the drawings do not constitute limitation of proportion.

DESCRIPTION OF EMBODIMENTS

In order to make purposes, technical solutions and advantages of the present application more clear, the present application is further described in detail in conjunction with drawings and embodiments. It should be understood that specific embodiments described herein are only used to explain the present application and are not used to limit the present application.

Unless otherwise defined, all technical and scientific terms used in the present specification have the same meanings as those commonly understood by persons of skills in the technical field of the present application. Terms used in the specification of the present application are only for the purpose of describing the specific embodiments and are not used to limit the present application. The term "and/or" used in the present specification includes any and all combinations of one or more related listed items.

An intelligent warehousing system provided herein may be applied to any suitable industry or technology field, such as the field of intelligent warehousing, the field of intelligent logistics, the field of intelligent sorting, etc. The embodiments of the present application takes an intelligent warehousing system, which is applied in the field of intelligent warehousing and can intelligently fetch a material according to an order of the material, as an example.

Figure 1:
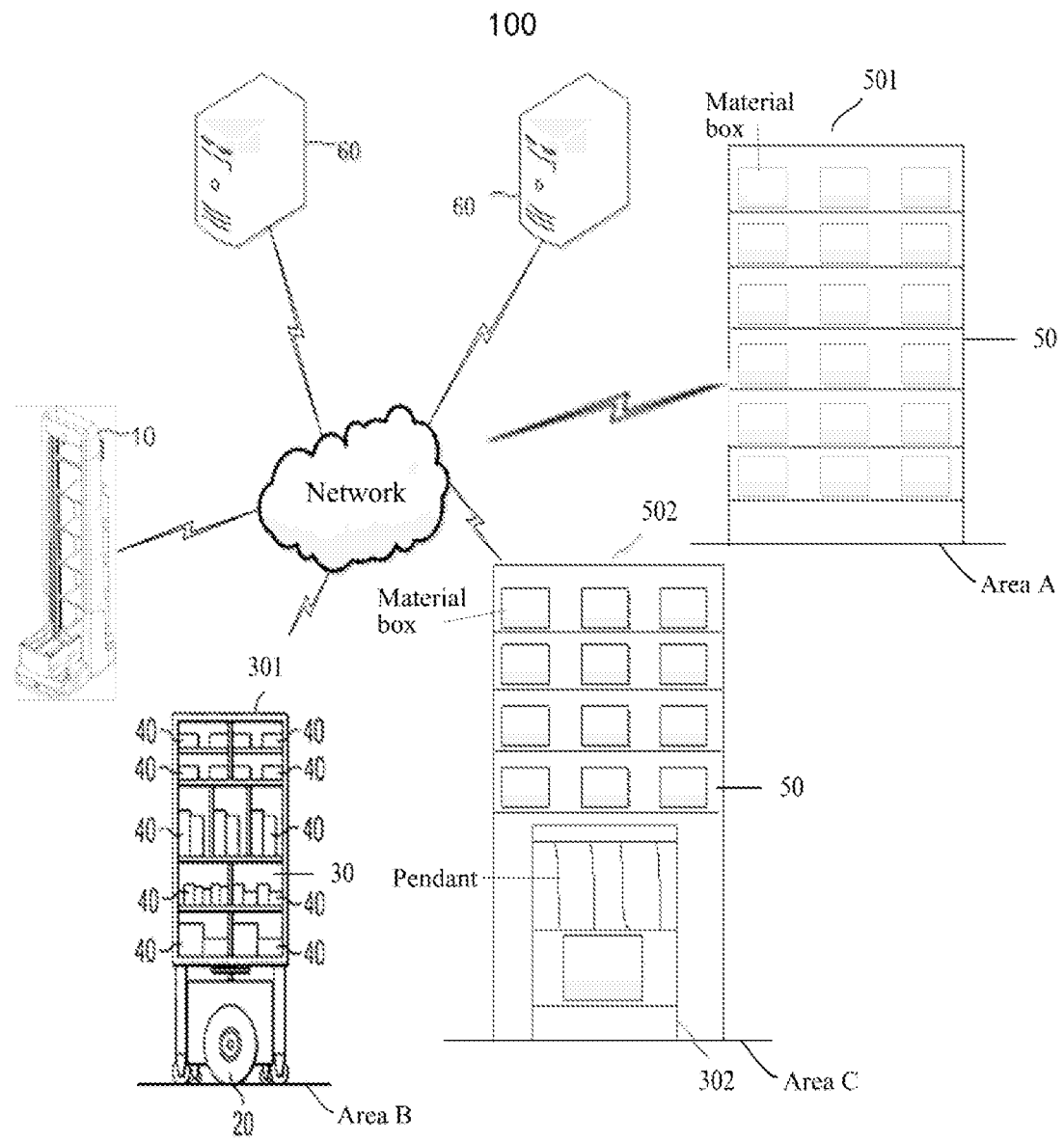
FIG. 1 is a composition diagram of an intelligent warehousing system provided by an embodiment of the present application.

In a schematic diagram of a composition of an intelligent warehousing system provided by an embodiment of the present application, as shown in FIG. 1, the intelligent warehousing system 100 includes a first warehousing robot 10 and a second warehousing robot 20, where the first warehousing robot 10 and the second warehousing robot 20 may be connected to a processing terminal 60 through a network, and the network may be a wired network or a wireless network. The first warehousing robot 10 is configured to fetch a material box on a fixed rack 50, and there is a material stored in the material box; the second warehousing robot 20 is configured to move a portable rack 30, and the portable rack 30 may store a material box or a material 40, where the material may be a large commodity, a pendant commodity or an ordinary commodity, where the ordinary commodity may include a first ordinary commodity, or a second ordinary commodity. The first ordinary commodity is usually stored in the material box, and the second ordinary commodity may be directly stored on the portable rack 30. The second ordinary commodity may usually be a commodity with relatively large sales volume, for example, a popular commodity, which may be directly stored on the portable rack 30 to save time for loading the commodity into the material box.

In the embodiment of the present application, the first warehousing robot 10 may receive a first scheduling instruction, where the first scheduling instruction may be used to instruct the first warehousing robot 10 to move to the fixed rack 50 to fetch the material box, and may move the material box to a first target position, where the first target position may be different preset positions, such as positions located on a material sorting platform or on a material transfer platform.

In the embodiment of the present application, the second warehousing robot 20 may receive a second scheduling instruction, where the second scheduling instruction may be used to instruct the second warehousing robot 20 to move to the portable rack 30, and may move the portable rack to a second target position, where the second target position may be different preset positions, such as positions located on a material sorting platform or on a material transfer platform.

In another embodiment of the present application, the warehousing system 100 may also include a processing station, and the processing station is provided with a put wall. The first target position and the second target position may be located in a preset area of the processing station, and the processing station is configured to sort a material in the material box moved by the first warehousing robot 10 and a material on the portable rack moved by the second warehousing robot 20 to places that correspond to the materials and on the put wall.

In yet another embodiment of the present application, both the first target position and the second target position can be located in a material processing area, such as an area where the processing station or an automatic transportation device is located. When the first target position and the second target position are both located on a processing station, there may be a plurality of processing stations. Therefore, the first target position and the second target position may be determined based on positions of the plurality of processing station. Each processing station is provided with a put wall. After moving materials to a processing station, the processing station sorts the materials according to orders and puts the sorted materials on the places on the put wall correspondingly. Each processing station may set a separate area in the put wall to place a large material or a pendant material; or a separate processing station is set to deal with the large material, or the sorted material is sent in the processing station to the automatic transportation device, for example, a conveyor belt, etc. After sorting a material at one of the processing stations, each warehousing robot may send remaining materials to other processing stations for sorting. When the first target position and the second target position are located in the area where the automatic transportation device is located, the material fetched by the warehousing robot is directly sent to the automatic transportation device and sorted in a traveling process of the automatic transportation device. After the materials of the orders are put on the places on the put wall, the first warehousing robot may be used to send the material box to a corresponding packing area or a secondary sorting area; or the second warehousing robot may be used to send the put wall to the packing area or the secondary sorting area.

In the embodiment of the present application, the intelligent warehousing system 100 may further include a fixed rack 50 or a portable rack 30, or both the fixed rack 50 and the portable rack 30, where the fixed rack 50 is configured to store a material box and/or a pallet; the portable rack 30 is configured to store a material, a material box and/or a pallet; the material box is configured to store a material; and the pallet is configured to hold a material or a material box. The pallet for holding a material is placed on the portable rack 30, and the pallet for holding a material box may be placed on the portable rack 30 or the fixed rack 50.

In the embodiment of the present application, the fixed rack 50 may be a first fixed rack 501 or a second fixed rack 502, and the portable rack 30 may be a first portable rack 301 or a second portable rack 302, where the second portable rack 302 is located within a lower space of the second fixed rack 502 to form a combined rack, so as to save warehouse space. Structures of the first portable rack 301 and the second portable rack 302 may be the same or different, and are not limited by the specific embodiments of the present application.

In the embodiment of the present application, there may be one or more first warehousing robots 10, one or more second warehousing robots 20, one or more first portable racks 301, one or more second portable racks 302, one or more first fixed racks 501, one or more second fixed racks 502, and one or more processing terminals 60, and there may be one or more combined rack composed of the second fixed rack 502 and the second portable rack 302. At the same time, the first warehousing robots 10, the second warehousing robots 20, the first portable racks 301, the first fixed racks 501, and the combined racks composed of the second fixed racks 502 and the second portable racks 302 may be located in different positions in the warehouse, and these positions may be divided into different areas. For example, a specific area A is divided in the warehouse to store the first fixed racks 501; a specific area B is divided to store the first portable racks 301; and a specific area C is divided to store the combined racks composed of the second fixed racks 502 and the second portable racks 302.

In another embodiment of the present application, the fixed rack and the portable rack may be randomly arranged in the whole warehouse, or may be arranged in designated regions. When the fixed rack and the portable rack are arranged in designated regions, when a fetching task is assigned, the first warehousing robot may be preferentially assigned with a fetching task in a first fixed rack area, such as a specific area A. When there is no material corresponding to a task to be assigned in area A, the first warehousing robot may enter other areas, such as a combined rack area (such as a specific area C) to fetch a material. For example, after receiving an order, a material box and a rack where a material having material SKU (Stock Keeping Unit, i.e., a basic unit of stock input-output measurement) information is located is queried. If the rack where a requested material is stored is in area A, a fetching task is assigned to the first warehousing robot. If the requested material having the SKU information is located in a rack in area C, and the rack in area C corresponds to the first warehousing robot, the fetching task is assigned to the first warehousing robot. If the requested material having the SKU information is located in a rack in area C, and the rack in area C corresponds to the second warehousing robot, the fetching task is assigned to the second warehousing robot. If it is queried that there are corresponding materials in area A and area C according to the SKU information, the task in area A will be assigned to the first warehouse robot preferentially, or it may not be assigned to the first warehouse robot preferentially but may be uniformly assigned according to fetching efficiency of the warehouse robots.

In yet another embodiment of the present application, different warehouse may include different combinations of different first fixed racks 501, different first portable racks 301 and combined racks, where the combined racks are composed of different second fixed racks 502 and different second portable racks 302. Moreover, there may be a plurality of combinations of various different types of racks to compose different warehouses. There may be one or more first warehousing robots 10 and one or more second warehousing robots 20 in different warehouses.

Figure 2A:
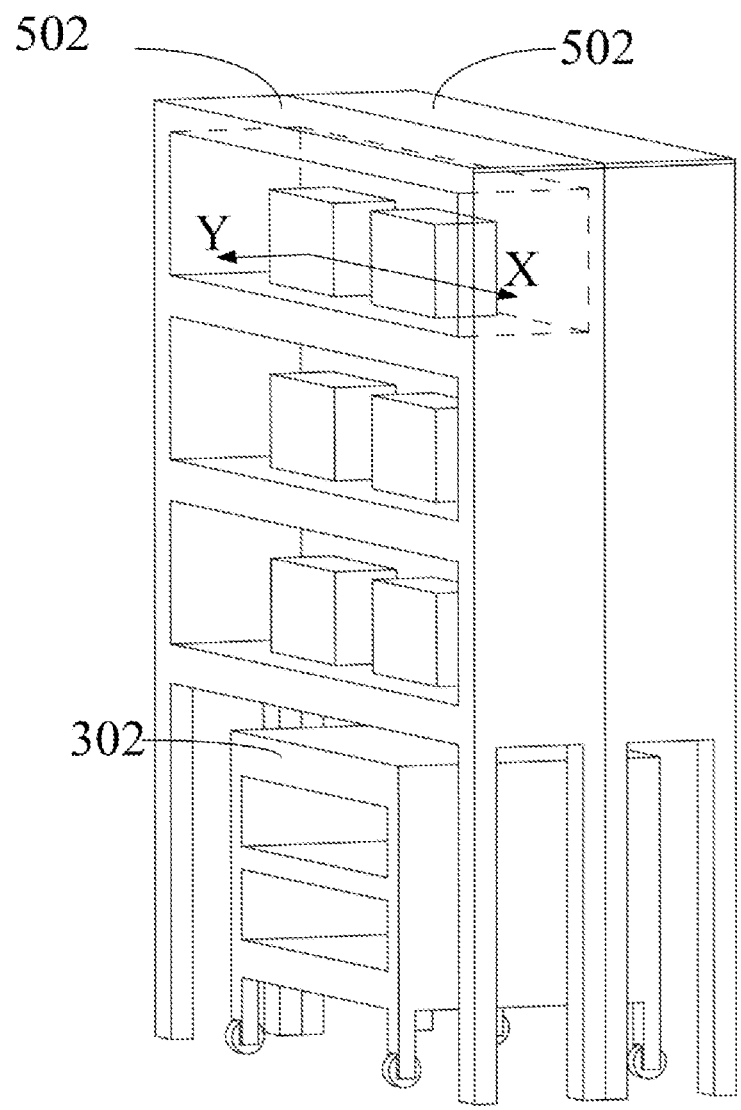
FIG. 2a, FIG. 2B, FIG. 3a, and FIG. 3b are respectively layout diagrams of combined racks in an intelligent warehousing system provided by an embodiment of the present application.
Figure 2B:
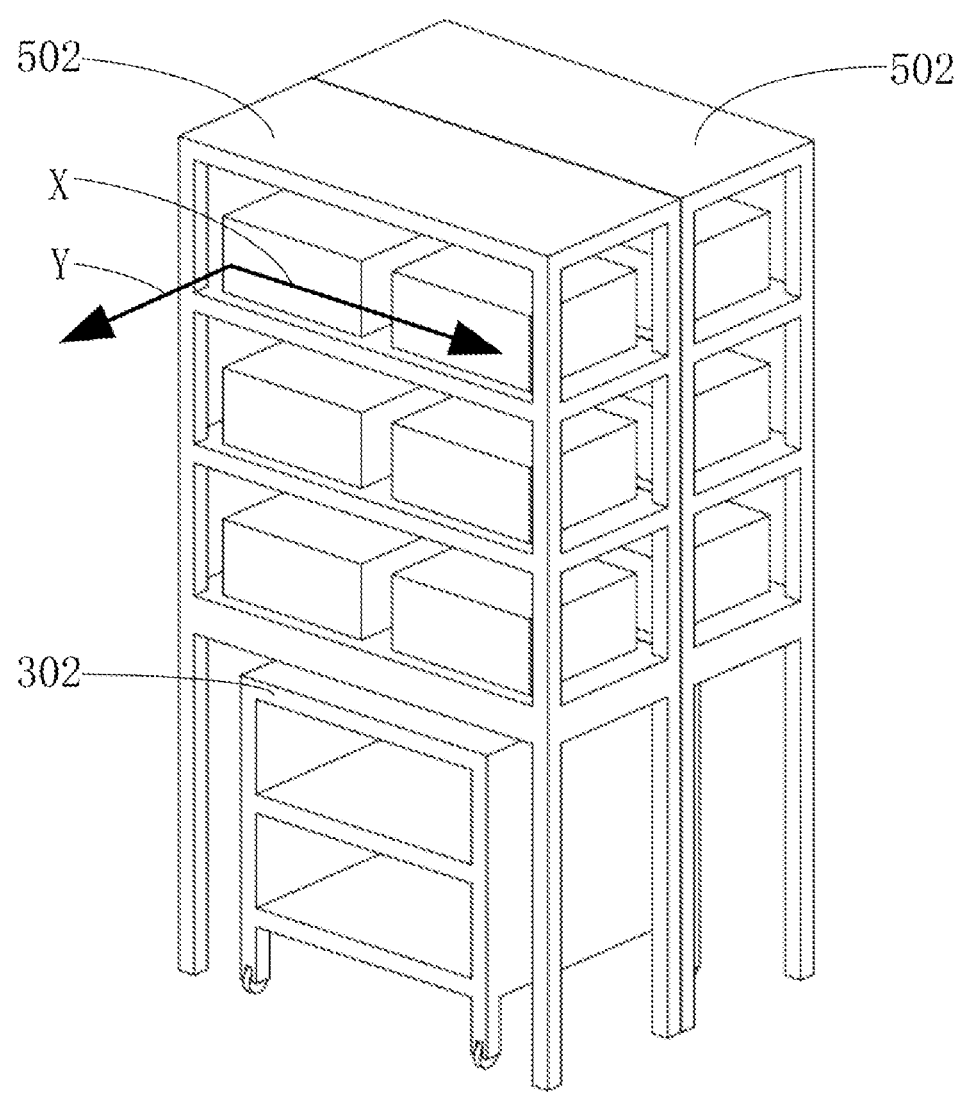
Figure 3A:
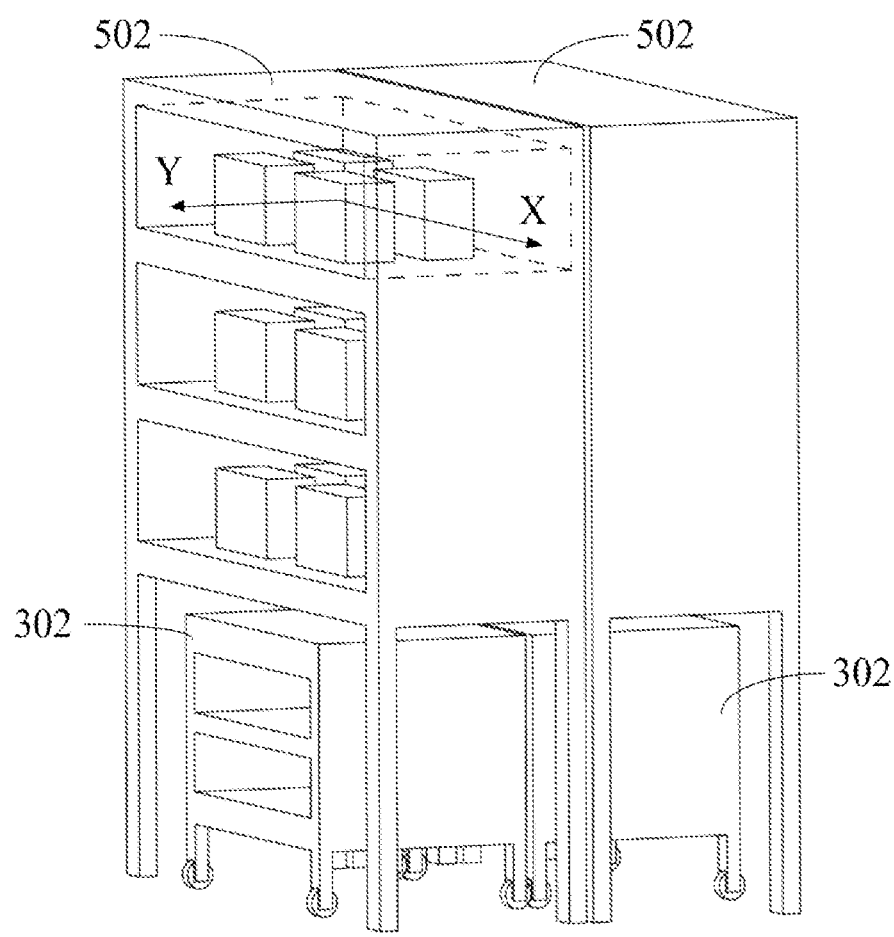
Figure 3B:
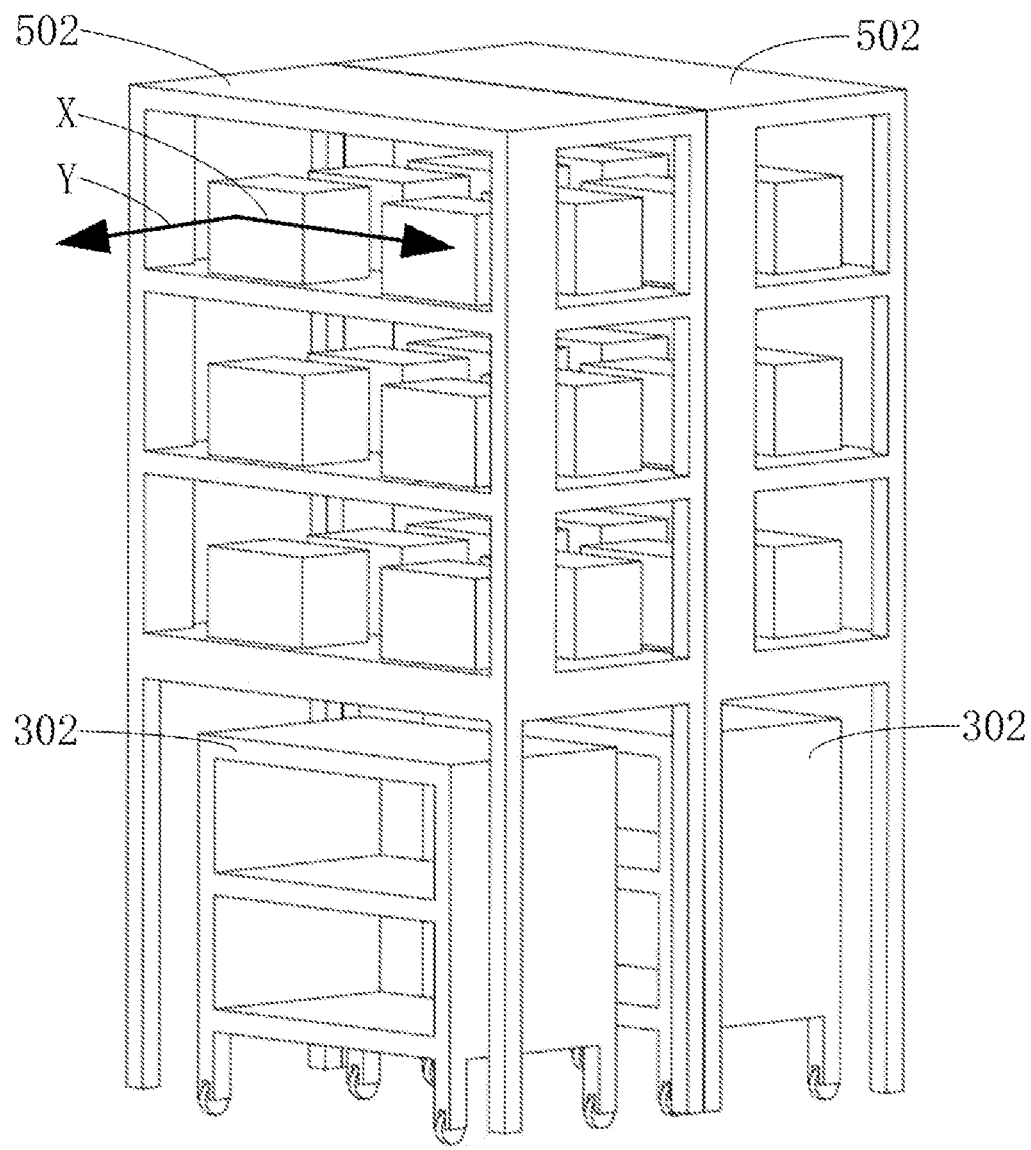

In the embodiment of the present application, for example, referring to FIGS. 2a, 2b, 3a and 3b, at least two second fixed racks 502 may be placed side by side in a longitudinal direction, and at least one second portable rack 302 may be placed within a space formed by the two fixed racks 502, so as to form a combined rack, where the two second fixed racks 502 may be a multi-layer space including a storage box. A plurality of material boxes may be placed side by side in an X-axis (horizontal) direction of each level of space. At the same time, one material box or two or more material boxes may be placed in a Y-axis (longitudinal) direction of each level of space. Referring to FIGS. 2a and 2b, if one material box is placed in the longitudinal direction of each level of space, a second portable rack 302 may be placed in the longitudinal direction in the lower space formed by the two fixed racks 502; and referring to FIGS. 3a and 3b, if at least two material boxes may be placed in the longitudinal direction of each layer of space, at least two second portable racks 302 may be placed side by side in the longitudinal direction in the lower space formed by the two fixed racks 502. For specific schematic diagram, reference please made to FIG. 2a, FIG. 2b, FIG. 3a, and FIG. 3b, where FIG. 2a is a schematic diagram in which a portable rack is placed under two fixed racks, where the fixed rack is a fixed rack with a single depth place (i.e., one material box is placed in the Y-axis direction); there are back plates on the two fixed racks; and there are side plates on both sides of the racks. FIG. 2b is a schematic diagram in which a portable rack is placed under the two fixed racks, where the fixed rack is a fixed rack with a single depth place (i.e., one material box is placed in the Y-axis direction); there is no back plate on the two fixed racks; and there is no side plate on both sides of the racks. FIG. 3a is a schematic diagram in which two portable racks are placed under the two fixed racks, where the fixed rack is a fixed rack with two depth places (i.e., two material boxes are placed in the Y-axis direction); there are back plates on the two fixed racks; and there are side plates on both sides of the racks. FIG. 3B is a schematic diagram in which two portable racks are placed under the two fixed racks, where the fixed rack is a fixed rack with two depth places (i.e., two material boxes are placed in the Y-axis direction); there is no back plate on the two fixed racks; and there is no side plate on both sides of the rack. It should be noted that, for each of the two depth places fixed rack in FIG. 3B, two single depth place fixed racks with no back plate and no side plate (as shown in FIG. 2b) may be placed side by side along the Y-axis direction, and two single depth place fixed racks form a two depth places fixed rack.

In the embodiment of the present application, there are different types of racks, such as the first portable rack 301, the second portable rack 302, the first fixed rack 501, the second fixed rack 502, and the combined rack formed by the combination of the second portable rack 302 and the second fixed rack 502. Moreover, there may be one or more racks of each type. Therefore, there may be a plurality of combinations of racks of various types in a warehouse placing rack. For example, there is a combination of the first portable rack 301 and the first fixed rack 501 in the warehouse; or, there is a combination of the combined rack and the first portable rack 301 in the warehouse; or there is a combination of the combined rack and the first fixed rack 501 in the warehouse; or there is a combination of the combined rack, the first portable rack 301 and the first fixed rack 501 in the warehouse. For the first portable rack 301, there may be various ways to store a material, one is to store the material directly on the rack, the other is to store the material in the material box on the rack; or the material and/or the material box are stored on a pallet, and the pallet is placed on the first portable rack. In addition, different portable racks may be located in different positions, for example, in different aisles or aisle entrances. When positions of the racks are different, there are also a variety of flexible layout manners. Based on the above situation, there are dozens of layout manners for the racks in the warehouse, which may be understood by persons of skills in the art, and will not be described in detail here.

In the embodiment of the present application, the intelligent warehousing system 100 may further include: a processing terminal 60, where the processing terminal may be configured to send the first scheduling instruction and/or the second scheduling instruction, where the first scheduling instruction is used to instruct the first warehousing robot 10 to fetch a material from the fixed rack 50, and the second scheduling instruction is used to instruct the second warehousing robot 20 to move the portable rack 30.

In the embodiment of the present application, the processing terminal 60 may be a background server, a computer device with processing capability, or a terminal device with computing function or scheduling function. The processing terminal 60 may communicate with the first warehousing robot 10 and the second warehousing robot 20 respectively through a network for information interaction with the first warehousing robot 10 and the second warehousing robot 20, for example, sending a scheduling instruction to instruct the warehousing robot to fetch a material according to a traveling route. Moreover, the processing terminal 60 may also receive external data and information, such as material fetching order information, position information, and a variety of corresponding relationship information. When sending the scheduling instruction, the processing terminal 60 usually needs to determine a position of the material based on material fetching information and material storage association information, and instruct a corresponding warehousing robot to fetch the material. For example, when a material of a material fetching order is located on a fixed rack, the processing terminal 60 sends the first scheduling instruction to instruct the first warehousing robot 10 to move to the fixed rack to fetch the material; and when the material of the material fetching order is located on a portable rack, the processing terminal 60 sends the second scheduling instruction to instruct the second warehousing robot 10 to move the portable rack to fetch the material. The scheduling instructions may include a receiving object of the instructions, a traveling route of the receiving object and specific execution content contained in the instructions. The receiving object may include the first warehousing robot 10 or the second warehousing robot 20; the traveling route may include a starting position, a traveling track, and a target position; and the specific execution content may include fetching a material or placing a material, etc.

In the embodiment of the present application, the processing terminal 60 may store the material storage association information, and the material storage association information includes at least one of the following information: material identification information, material box identification information, rack identification information, position information of a rack for storing a material, position information of a material box for storing a material, a corresponding relationship between racks and material boxes, a corresponding relationship between racks and materials, a corresponding relationship between material boxes and materials.

The material identification information may be a variety of codes on the material, such as a two-dimensional code or a bar code or SKU information. The code information may include any one or more attributes of brand, model, configuration, grade, design and color, packaging capacity, unit, production date, expiration date, purpose, price, production place, etc.

The material box identification information may be identified by different serial numbers. Each material box has its own specific serial number. The serial number information may include one or more of model, specification, type and the like.

The rack identification information may be numbered according to different types of racks and their layout positions to distinguish different racks on different positions in the warehouse.

The position information of a rack for storing a material may identify a specific rack position of a specific material in the warehouse. For example, position information of a specific rack containing a material may be identified with a two-dimensional code map.

The position information of a material box for storing a material may identify a position of the material box storing the material on a specific rack, for example, specific position information on a specific rack in the warehouse.

In the embodiment of the present application, in order to determine a corresponding rack or a material box according to the material information, for example, the specific commodity information is represented by an SKU number, and each commodity material corresponds to a unique SKU number, it is necessary to include a corresponding relationship between racks and material boxes, a corresponding relationship between racks and materials, and a corresponding relationship between material boxes and materials in the material storage association information stored in the processing terminal 60 in advance. A rack or a material box that stores a material having a SKU number may be determined through the corresponding relationship and material information. And a position of the material having the SKU number may be determined according to at least one of: the rack identification information, the material box identification information, the position information of the rack and the position information of the material box.

The processing terminal 60 is specifically configured to:
 obtain information of a material to be fetched and placed, and determine a position of the material to be fetched and placed based on the information of the material to be fetched and placed and the material storage association information;
 send based on the position of the material to be fetched and placed, the first scheduling instruction to instruct the first warehousing robot to move to the fixed rack to fetch the material; or,
 send the second scheduling instruction to instruct the second warehousing robot to move to the portable rack to fetch the material.

In the embodiment of the present application, during a process of adding a material on the rack, the processing terminal 60 may instruct the second warehousing robot to move the portable rack to a position where the material is added, and after the material is added on the portable rack, the second warehousing robot moves the portable rack to a position in the warehouse. Then, the processing terminal 60 sets and stores a corresponding relationship between the portable rack and a coordinate position of the portable rack in the warehouse. When the material is added by the first warehousing robot, a material with corresponding SKU information is stored in the material box with identification, and a corresponding relationship among a corresponding rack, rack position information, the material box and the material SKU information is set and stored in the processing terminal 60. The first warehousing robot and the second warehousing robot are uniformly scheduled by the processing terminal. The processing terminal 60 stores a corresponding relationship among the material SKU information and the material box, the rack, the rack position and the type of the rack, and performs assignment of material fetching by robots according to SKU information in the received order. After receiving a material order, the processing terminal 60 queries the material box that has the material having the SKU information of the ordered material, queries the rack according to the material box, and assigns a task according to the type of rack. If the type of the rack corresponds to the first warehousing robot, the task is assigned to the first warehousing robot; and if the type of the rack corresponds to the second warehousing robot, the task is assigned to the second warehousing robot.

Figure 4:
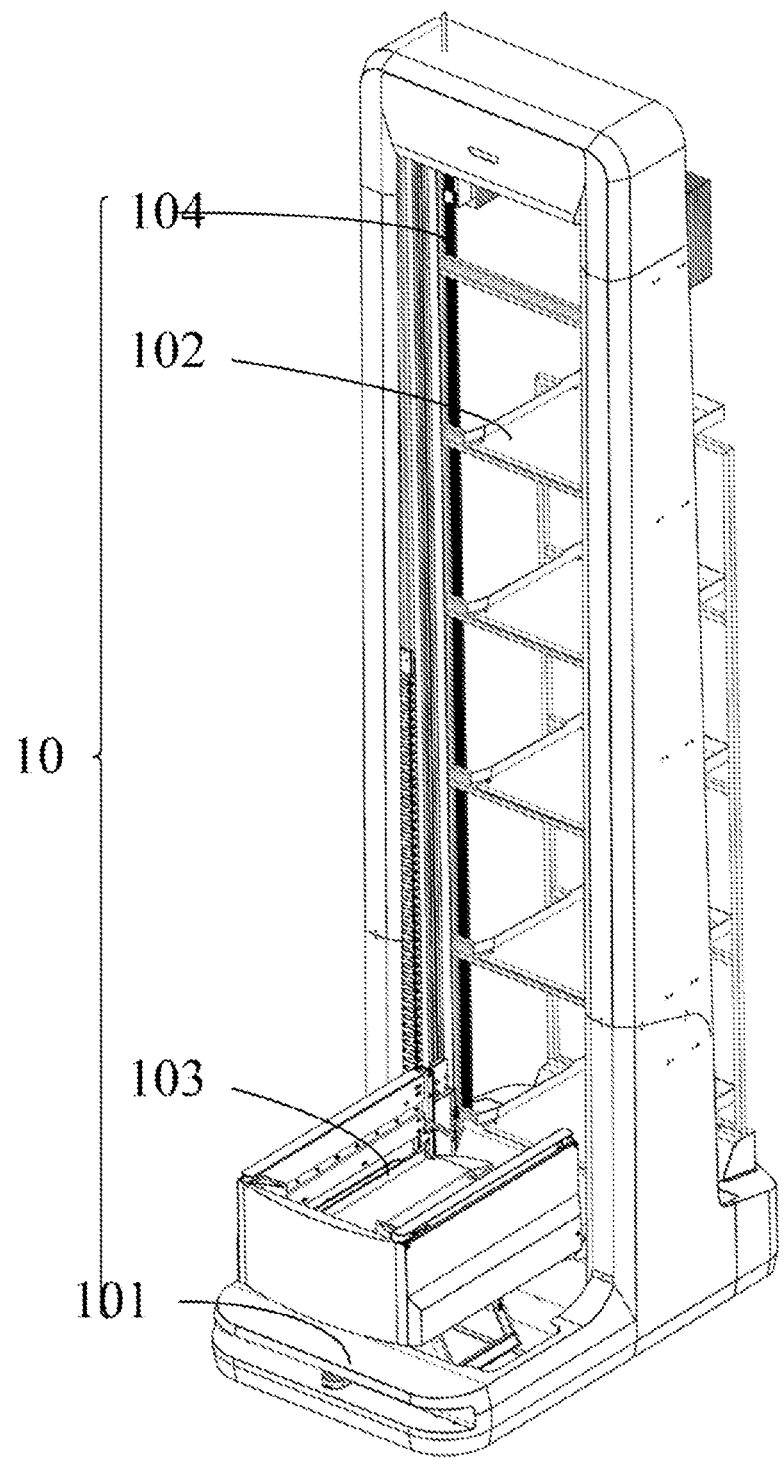
FIG. 4 is a structural diagram of a first warehousing robot provided by an embodiment of the present application.

FIG. 4 is a structural diagram of a first warehousing robot provided by an embodiment of the present application. Referring to FIG. 4, the first warehousing robot 10 includes a mobile chassis 101, a storage rack 102, a picking component 103, and a lift component 104, where the storage rack 102, the picking component 103 and the lift component 104 are all installed on the mobile chassis 101. The mobile chassis 101 is configured to enable the first warehousing robot 10 to move according to a planned path. The storage rack 102 is configured to store a material. In some embodiments, the storage rack 102 may include a plurality of storage units, each of which may hold one or more materials. The picking component 103 may move along a longitudinal direction so that a position of the picking component 103 is horizontally opposite to any one of the storage units. The picking component 103 is configured to pick a material between a preset position of the first fixed rack 50 and any one of the storage units. The lift component 104 is configured to drive the picking component 103 to move along the longitudinal direction with respect to the storage rack 102. The lift component 104 includes a lift transmission mechanism and a lift driving mechanism, where the lift driving mechanism is configured to provide a second driving force for the picking component 103 to move along the longitudinal direction with respect to the storage rack 102, and the lift transmission mechanism is configured to transfer the second driving force to the picking component 103.

Figure 5:
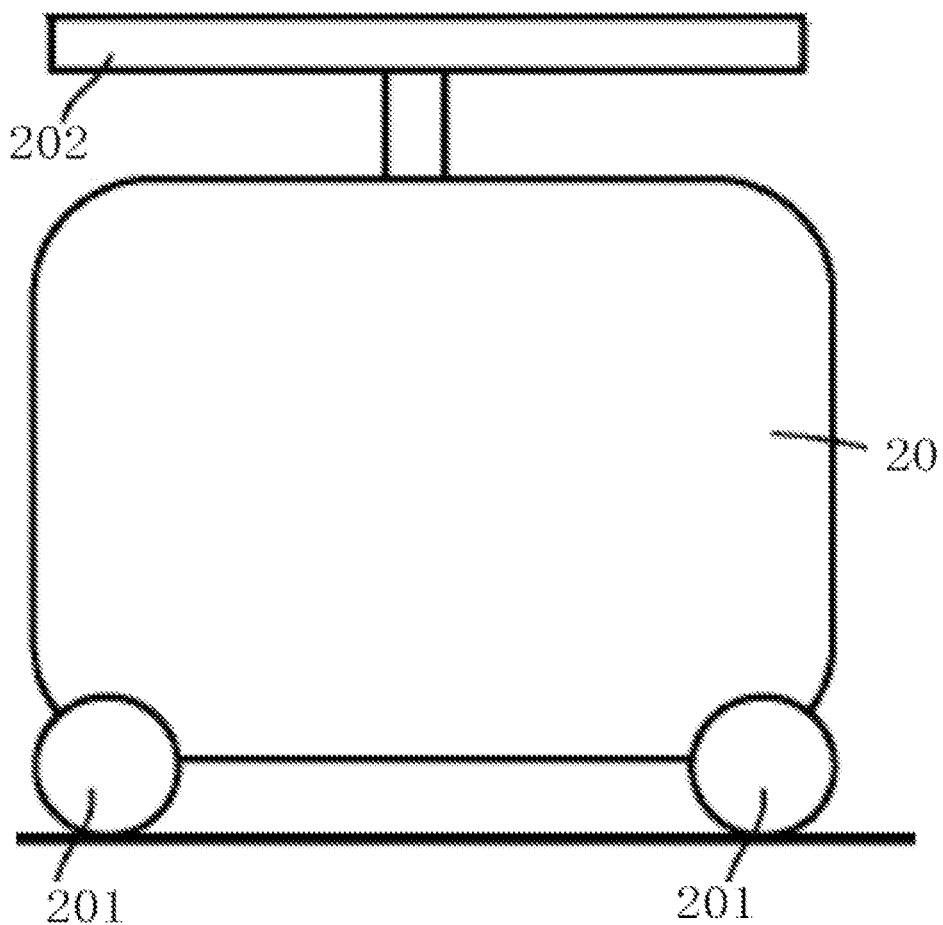
FIG. 5 is a structural diagram of a second warehousing robot provided by an embodiment of the present application.

FIG. 5 is a structural diagram of a second warehousing robot provided by an embodiment of the present application. Referring to FIG. 5, the second warehousing robot 20 includes a driving mechanism 201 and a lift mechanism 202, where the driving mechanism 201 may drive the second warehousing robot 20 to be able to move in a working space, for example, a warehouse, and the lift mechanism 202 is configured to move the portable rack 30. When the lift mechanism 202 is raised, it may lift the portable rack 30 from the ground, and when the lift mechanism 202 is declined, it may place the portable rack 30 on the ground.

Figure 6:
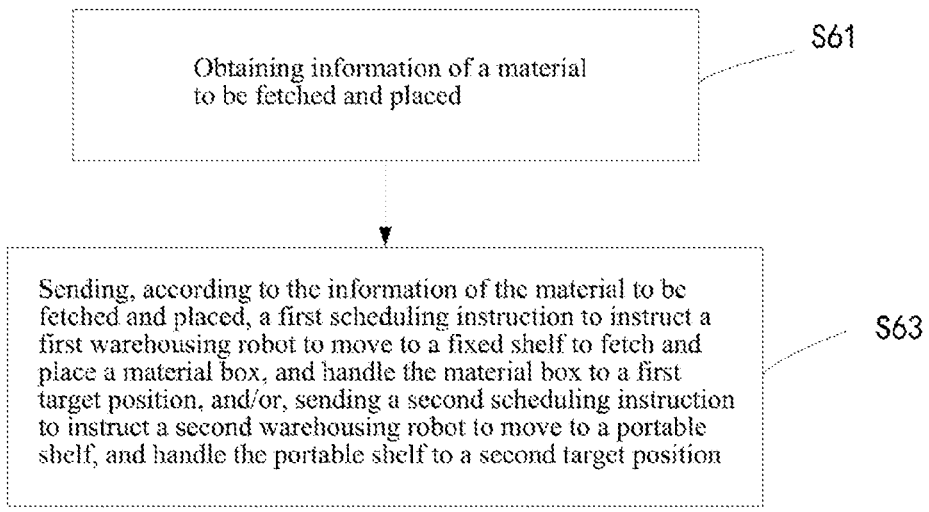
FIG. 6 is a flow diagram of a material fetching method provided by an embodiment of the present application.

FIG. 6 is a flow diagram of a material fetching method provided by an embodiment of the present application. The material fetching method is applied to the processing terminal of the intelligent warehousing system, and the intelligent warehousing system includes a first warehousing robot and a second warehousing robot. As shown in FIG. 6, the method includes:

S61, obtaining information of a material to be fetched and placed.

In the embodiment of the present application, the information of the material to be fetched and placed may include order information of the material to be fetched or information of a material to be added on a rack. The information of the material may be SKU information of the material. When the information of the material to be fetched and placed is the order information of the material to be fetched, SKU information of the ordered material may be obtained, including a name, a model, a number, a style, and so on of the material to be fetched. When the information of the material to be fetched and placed is the information of the material to be added on the rack, the material may be stored in the material box or on the rack. Then, a relationship among the material information, the material box and the rack may be established. The relationship could be, for example, a correspondence between SKU information of the material and material box identification information, a correspondence between the SKU information of the material and rack identification information, or a correspondence between the material box identification information and the rack identification information. Moreover, when the material has been added on the rack and placed on a designated position, position information is stored, where the position information may include specific position information of the rack where the material is stored and specific position information of the material box where the material is stored.

S63, sending, based on the information of the material to be fetched and placed, a first scheduling instruction to instruct the first warehousing robot to move to a fixed rack to fetch a material box, and move the material box to a first target position, and/or, sending a second scheduling instruction to instruct the second warehousing robot to move to a portable rack, and move the portable rack to a second target position.

In the embodiment of the present application, a type of the rack or container storing the material, or a type of material may be determined based on the information of the material to be fetched. A warehousing robot for material fetching may be selected based on the information. Different types of racks, containers or material types may be assigned specific types of warehousing robots. For example, the first warehousing robot may be designated to perform tasks involving materials in a fixed rack, and the second warehousing robot may be designated to perform tasks for materials in the portable rack. When a warehousing robot is selected, a scheduling instruction may be sent to instruct the warehousing robot to fetch the material. For example, the first scheduling instruction may be sent to instruct the first warehousing robot to move to the fixed rack to fetch the material, and move the material to the first target position, and/or, the second scheduling instruction may be sent to instruct the second warehousing robot to move to the portable rack, and move the portable rack to the second target position.

In the material fetching method provided by the embodiment of the present application, by obtaining information of a material to be fetched and placed; based on the information of the material to be fetched and placed; and based on the position of the material to be fetched and placed, sending a first scheduling instruction to instruct a first warehousing robot to move to a fixed rack to fetch a material, and move the material to a first target position; and/or sending a second scheduling instruction to instruct a second warehousing robot to move to a portable rack, and move the portable rack to a second target position, flexibility of the material fetching method is improved, which may be applied to a warehouse with different racks, improving utilization rate of the warehouse.

Figure 7A:
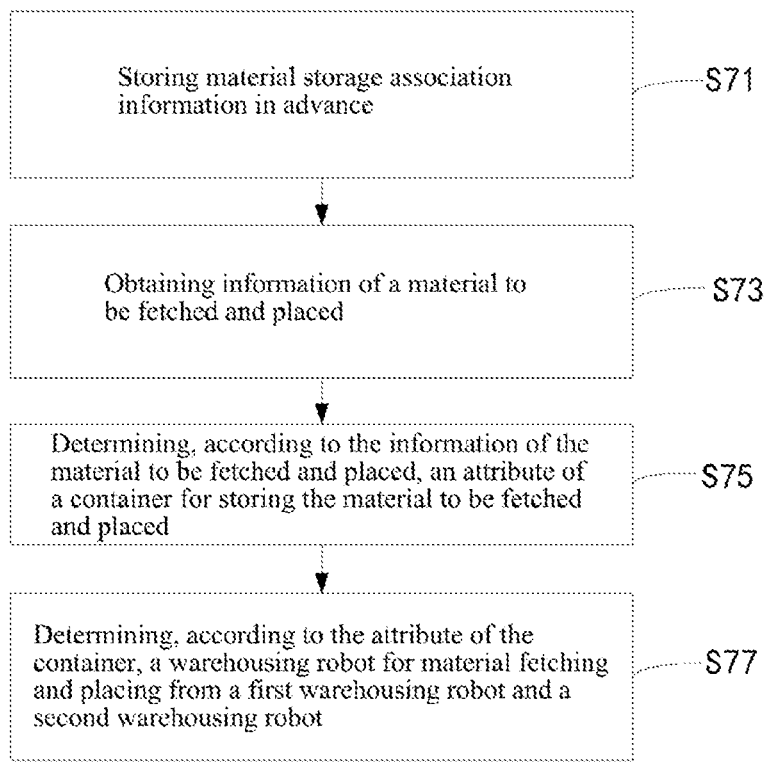
FIG. 7a is a flow diagram of a material fetching method provided by another embodiment of the present application.

FIG. 7a is a flow diagram of a material fetching method provided by another embodiment of the present application. The material fetching method is applied to the processing terminal of the intelligent warehousing system, and the intelligent warehousing system includes a first warehousing robot and a second warehousing robot. As shown in FIG. 7a, the method includes:

S71, storing material storage association information in advance.

In the embodiment of the present application, the material storage association information includes at least one of the following information:

material identification information, material box identification information, rack identification information, position information of a rack for storing a material, position information of a material box for storing a material, a corresponding relationship between racks and material boxes, a corresponding relationship between racks and materials, a corresponding relationship between material boxes and materials. These association information may be stored in a storage space of the processing terminal when the material are added on a rack, or the user may input part of the information into the storage space of the processing terminal in advance, such as a rack position, and then a corresponding relationship among a material, a material box and a rack is established when the material are added on the rack.

S73, obtaining information of a material to be fetched and placed.

In the embodiment of the present application, the information of the material to be fetched and placed may include order information of the material to be fetched or information of a material to be added on a rack. The information of the material may be SKU information of the material. When the material need to be fetched, the SKU information of the material on the order may be obtained, and the information may include name, model, number, style, etc. of the material to be fetched. When the material needs to be added on the rack, the material may be stored in the material box or on the rack, and a relationship among the material information, the material box and the rack may be established, for example, a corresponding relationship between SKU information of the material and material box identification information, a corresponding relationship between the SKU information of the material and rack identification information. Moreover, when the material has been added on the rack and placed on a designated position, position information is stored, where the position information may include specific position information of the rack where the material is stored and specific position information of the material box where the material is stored.

S75, determining, based on the information of the material to be fetched and placed, a container that is storing the material to be fetched and placed.

In the embodiment of the present application, after obtaining the information of the material to be fetched and placed, for example, when it is necessary to fetch the material, SKU information of an ordered material may be obtained, and a container that is storing the material to be fetched may be determined based on the SKU information. The container includes a material box of the fixed rack, a material box of the portable rack, and/or the portable rack. Material storage association information corresponding to the SKU information may be queried based on the SKU information, and the container that is storing the SKU material may be determined from the material storage association information. When it is necessary to store a material, a material box or rack that may store the material to be stored is determined according to SKU information of the material. For example, an ordinary material is stored in the material box, and a large material and a pendant material are stored in a first portable rack and/or a second portable rack; and the ordinary material may be a type of a material that may be placed in a material box and stored in a first fixed rack, a second fixed rack, the first portable rack, and the second portable rack, except for a large material and a pendant material.

In the embodiment of the present application, there may be different racks, for example, the first fixed rack and/or the second fixed rack, the first portable rack and/or the second portable rack, where the second portable rack is located within a lower space of the second fixed rack to form a combined rack.

In another embodiment of the present application, the container that is storing the material to be fetched and placed may be determined based on material fetching information. For example, the container that is storing the material may be directly determined based on the SKU information. For example, if the material to be placed is a pendant material, a container that is storing the pendant material may be directly determined to be a portable rack based on the material fetching information, thus the pendant rack is added on the portable rack. In addition, if the container cannot be determined directly based on the material fetching information, the container where the material to be fetched is located may be determined in combination with the material storage association information. For example, if a piece of ordinary material is to be fetched according to a material fetching order, the ordinary material may be stored in any material box on the fixed rack. Then, a plurality of material boxes storing with the ordinary material may be determined according to SKU of the order, and when a specific material box is chosen from the plurality of material boxes, it may be determined based on the material storage association information.

S77, selecting, based on the container, a warehousing robot for material fetching from the first warehousing robot and the second warehousing robot.

In the embodiment of the present application, different material boxes correspond to different warehousing robots, where the material box of the fixed rack corresponds to the first warehousing robot, and the material box of the portable rack or the portable rack corresponds to the second warehousing robot.

In other embodiments of the present application, when there are different types of racks, containers thereof are different from each other, and the methods for determining the warehousing robot are also different.

For example, when a type of the rack is the combined rack: if the container where the material to be fetched is located corresponds to the material box of the fixed rack, a first scheduling instruction is sent to instruct the first warehousing robot to move to the second fixed rack of the combined rack where the material to be fetched is located, and fetch a material box where the material to be fetched is located from the corresponding second fixed rack to realize material fetching; if the container where the material to be fetched is located corresponds to the material box of the portable rack and/or the portable rack, a second scheduling instruction is sent to instruct the second warehousing robot to move to the second portable rack of the combined rack where the material to be fetched is located, and move the corresponding second fixed rack to realize material fetching.

Figure 7B:
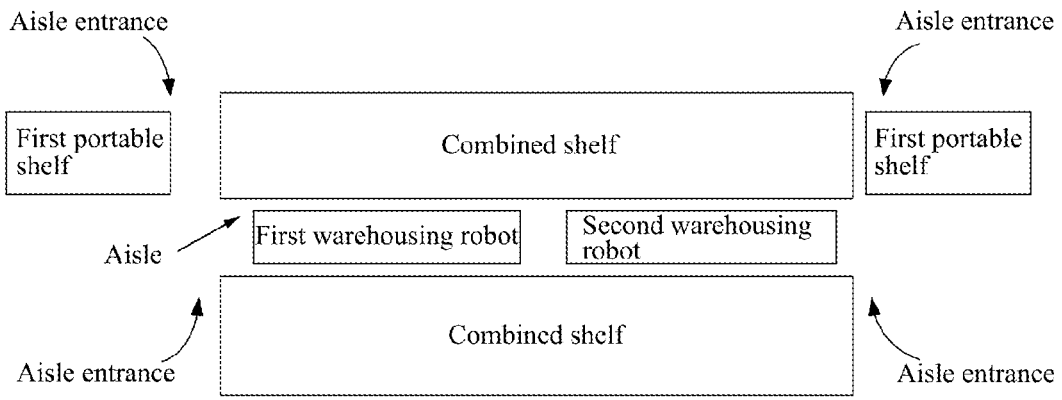
FIG. 7b is a schematic diagram of an aisle entrance provided by an embodiment of the present application.

When a type of the rack includes the combined rack and the first portable rack, and the first portable rack is located at an aisle entrance, where a position of the aisle entrance is shown in FIG. 7b, if the container where the material to be fetched is located corresponds to the material of the fixed rack, a first scheduling instruction is sent to instruct the first warehousing robot to move to the second fixed rack of the combined rack where the material to be fetched is located, fetch a material box where the material to be fetched is located from the corresponding second fixed rack, and store the material box to the first portable rack at the aisle entrance; when it is necessary to move the first portable rack at the aisle entrance, a second scheduling instruction is sent to instruct the second warehousing robot to move the first portable rack to a designated position; if the container where the material to be fetched is located corresponds to the material box of the portable rack and/or the portable rack, the second scheduling instruction is sent to instruct the second warehousing robot to move to the second portable rack of the combined rack where the material to be fetched is located or the first portable rack at the aisle entrance, and move the corresponding second portable rack or the first portable rack to realize material fetching.

When a type of the rack includes the first fixed rack and the first portable rack, and the first portable rack is located at an aisle entrance: if the container where the material to be fetched is located corresponds to the material box of the fixed rack, a first scheduling instruction is sent to instruct the first warehousing robot to move to the first fixed rack where the material to be fetched is located, fetch a material box where the material to be fetched is located from the corresponding first fixed rack, and store the material box to the first portable rack at the aisle entrance, and when it is necessary to move the first portable rack at the aisle entrance, a second scheduling instruction is sent to instruct the second warehousing robot to move the first portable rack to a designated position; if the container where the material to be fetched is located corresponds to the material box of the portable rack and/or the portable rack, the second scheduling instruction is sent to instruct the second warehousing robot to move to the first portable rack where the material to be fetched is located, and move the corresponding first portable rack realize material fetching.

By adopting the warehousing system using two types of robots in combination, when a material is added on the rack, the processing terminal may schedule the second warehousing robot to move the portable rack to a position where the material is added on the rack and add a larger or pendant material on a corresponding portable rack in advance; and the rack where the operation of adding material is finished is moved to a corresponding position in the warehouse by the second warehousing robot; and in the processing terminal, a corresponding relationship between the rack where the material box is located and a coordinate position of the rack in the warehouse may be set and stored.

When the material is added by the first warehousing robot, a corresponding SKU material is stored in a box with material box identification, and a corresponding relationship among a corresponding rack, rack position information, the box and an SKU material box in the processing terminal.

The two types of robots may be scheduled in a unified way. The processing terminal will store a corresponding relationship among the SKU and the material box, the rack, the rack position, and a type of the rack, and perform assignment of material fetching by robots according to SKU information in the received order. After receiving an order, the material box corresponding to the SKU is queried; the rack is queried according to the material box, and a task is assigned according to a container corresponding to the material box or the rack; if the container corresponds to the first warehousing robot, the task is assigned to the first warehousing robot; if the container corresponds to the second warehousing robot, the task is assigned to the second warehousing robot. If a same SKU appears in racks with different attributes, a robot is chosen according to an optimal efficiency scheme for task assignment. Different robots may move the material to a processing area after fetching the material.

In the embodiment of the present application, it may be determined whether it is necessary to move the first portable rack at the aisle entrance according to the number of materials on a rack, or according to a current actual situation, for example, it may be determined whether it is necessary to move the first portable rack to a sorting platform in time according to the number of materials to be sorted by the sorting platform.

The material fetching method provided by the embodiment of the present application may determine a warehousing robot for material fetching according to a container storing a material, which improves speed of material fetching. At the same time, it may be applied to different rack scenarios and improve flexibility of the material fetching method and utilization rate of a warehouse.

Figure 8:
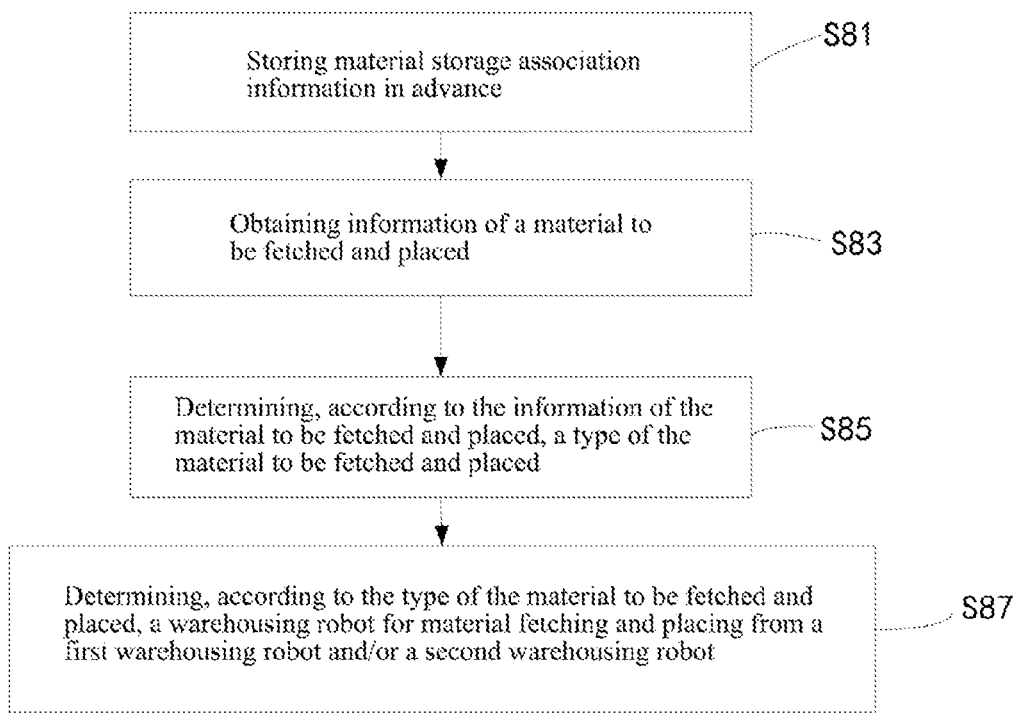
FIG. 8 is a flow diagram of a material fetching method provided by another embodiment of the present application.

FIG. 8 is a flow diagram of a material fetching method provided by another embodiment of the present application. The material fetching method is applied to the processing terminal of the intelligent warehousing system, where the intelligent warehousing system includes a first warehousing robot and a second warehousing robot. As shown in FIG. 8, the method includes:

S81, storing material storage association information in advance.

In the embodiment of the present application, the material storage association information includes at least one of the following information:

material identification information, material box identification information, rack identification information, position information of a rack for storing a material, position information of a material box for storing a material, a corresponding relationship between racks and material boxes, a corresponding relationship between racks and materials, a corresponding relationship between material boxes and materials. These association information may be stored in a storage space of the processing terminal when the material are added on a rack, or the user may input part of the information into the storage space of the processing terminal in advance, such as a rack position, and then a corresponding relationship among a material, a material box and a rack is established when the material are added on the rack.

S83, obtaining information of a material to be fetched and placed.

In the embodiment of the present application, the information of the material to be fetched and placed may include order information of the material to be fetched or information of a material to be added on a rack. The information of the material may be SKU information of the material. When the material need to be fetched, the SKU information of the material on the order may be obtained, and the information may include name, model, number, style, etc. of the material to be fetched. When the material needs to be added on the rack, the material may be stored in the material box or on the rack, and a relationship among the material information, the material box and the rack may be established, for example, a corresponding relationship between SKU information of the material and material box identification information, a corresponding relationship between the SKU information of the material and rack identification information. Moreover, when the material has been added on the rack and placed on a designated position, position information is stored, where the position information may include specific position information of the rack where the material is stored and specific position information of the material box where the material is stored.

S85, determining, based on the information of the material to be fetched and placed, a type of the material to be fetched and placed.

In the embodiment of the present application, the type of the material to be fetched and placed includes a first ordinary material stored on a fixed rack, a second ordinary material stored on a portable rack, a large material or a pendant material.

In the embodiment of the present application, after obtaining the information of the material to be fetched and placed, for example, when it is necessary to fetch the material, SKU information of an ordered material may be obtained, and a type of the material may be determined according to the SKU information. The type of the material to be fetched and placed includes the first ordinary material stored on the fixed rack, the second ordinary material stored on the portable rack, the large material or the pendant material. A first ordinary commodity is usually stored in a material box of the fixed rack, and a second ordinary commodity may be directly stored on the portable rack. The second ordinary commodity may usually be a commodity with relatively large sales volume, for example a popular commodity, which may be directly stored on the portable rack to save time for loading the commodity into the material box. When it is necessary to fetch a material, a type of the material may be determined according to SKU information of the material to be fetched and placed, and a material box or a rack that may store the material to be fetched and placed may be determined based on the type of the material. For example, the first ordinary material is stored on the fixed rack, and the second ordinary material is placed on the portable rack.

S87, selecting, based on the type of the material to be fetched and placed, a warehousing robot for material fetching from the first warehousing robot and/or the second warehousing robot.

In the embodiment of the present application, different types of materials correspond to different warehousing robots, where the first ordinary material corresponds to the first warehousing robot, and the second ordinary material, the large material or the pendant material correspond to the second warehousing robot. When the material to be fetched is the second ordinary material, the large material or the pendant material, the second warehousing robot is instructed to fetch the material. When the material to be fetched up is the first ordinary material, the first warehousing robot is instructed to fetch a material box storing the first ordinary material from the fixed rack.

In the embodiment of the present application, the two types of robots may be scheduled in a unified way. The processing terminal will perform assignment of material fetching by robots based on SKU information in the received order according to a pre-stored position relationship among the material box, the material, the rack, and the rack.

If it is a large material or a pendant material, the second warehousing robot will be assigned to fetch a material. If it is a SKU of an ordinary material, the first warehousing robot is assigned to fetch a material. After fetching the material, the first warehousing robot will move the material to the first portable rack at the aisle entrance. When the first portable rack at the aisle entrance is full of materials or needs to move, the second warehousing robot will be assigned to move the rack to an area to be processed. That is to say, the first warehousing robot is preferentially responsible for running in a same aisle, and the second warehousing robot is responsible for transportation on a main road. According to an order situation, a same aisle with a large material fetching volume may be assigned to a robot preferentially, and after finishing tasks in the aisle, the robot will go to another aisle with high priority to fetch a material.

The material fetching method provided by the embodiment of the present application may select a warehousing robot for material fetching based on a type of the material to be fetched and placed, which improves speed of material fetching. At the same time, using different types of warehousing robots to fetch different types of material may be applied to different scenarios, which improves flexibility of the material fetching method and utilization rate of a warehouse.

Figure 9:
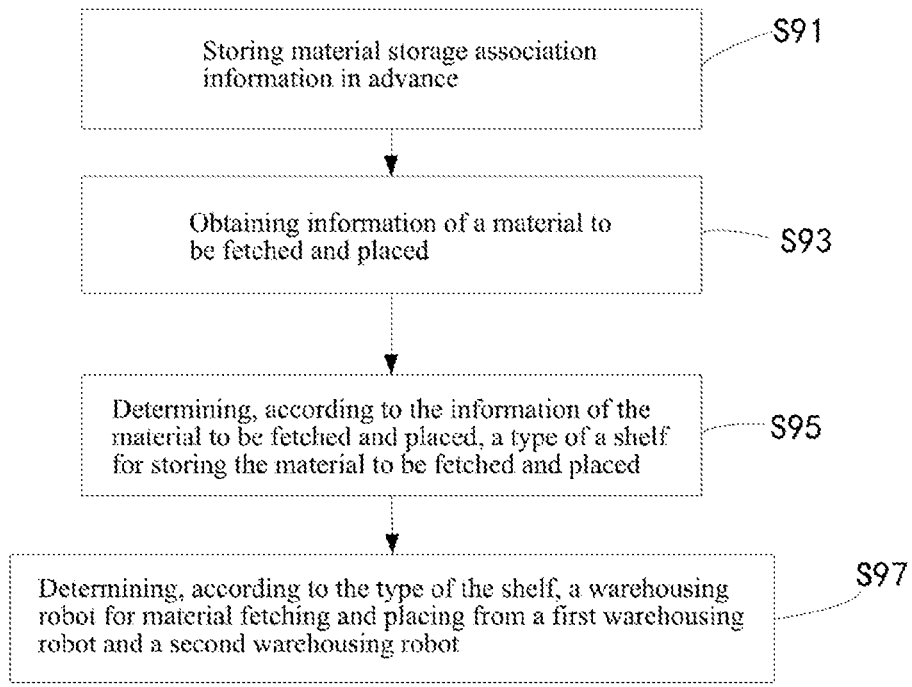
FIG. 9 is a flow diagram of a material fetching method provided by another embodiment of the present application.

FIG. 9 is a flow diagram of a material fetching method provided by another embodiment of the present application. The material fetching method is applied to the processing terminal of the intelligent warehousing system, where the intelligent warehousing system includes a first warehousing robot and a second warehousing robot. As shown in FIG. 9, the method includes:

S91, storing material storage association information in advance.

In the embodiment of the present application, the material storage association information includes at least one of the following information:

material identification information, material box identification information, rack identification information, position information of a rack for storing a material, position information of a material box for storing a material, a corresponding relationship between racks and material boxes, a corresponding relationship between racks and materials, a corresponding relationship between material boxes and materials. These association information may be stored in a storage space of the processing terminal when the material are added on a rack, or the user may input part of the information into the storage space of the processing terminal in advance, such as a rack position, and then a corresponding relationship among a material, a material box and a rack is established when the material are added on the rack.

S93, obtaining information of a material to be fetched and placed.

In the embodiment of the present application, the information of the material to be fetched and placed may include order information of the material to be fetched or information of a material to be added on a rack. The information of the material may be SKU information of the material. When the material need to be fetched, the SKU information of the material on the order may be obtained, and the information may include name, model, number, style, etc. of the material to be fetched. When the material needs to be added on the rack, the material may be stored in the material box or on the rack, and a relationship among the material information, the material box and the rack may be established, for example, a corresponding relationship between SKU information of the material and material box identification information, a corresponding relationship between the SKU information of the material and rack identification information. Moreover, when the material has been added on the rack and placed on a designated position, position information is stored, where the position information may include specific position information of the rack where the material is stored and specific position information of the material box where the material is stored.

S95, determining, based on the information of the material to be fetched and placed, a type of a rack for storing the material to be fetched and placed.

In the embodiment of the present application, there may be different racks, for example, a first fixed rack and/or a second fixed rack, a first portable rack and/or a second portable rack, where the second portable rack is located within a lower space of the second fixed rack to form a combined rack. The type of the rack includes the first fixed rack, the first portable rack and the combined rack formed by the second fixed rack and the second portable rack.

In the embodiment of the present application, after obtaining the information of the material to be fetched, for example, when it is necessary to fetch a material, SKU information of an ordered material may be obtained, and a type of a rack for storing the material to be fetched may be determined according to the SKU information. The type of the rack includes the first fixed rack, the first portable rack and the combined rack formed by the second fixed rack and the second portable rack. Material storage association information corresponding to the SKU information may be queried based on the SKU information, and the type of the rack for storing the SKU material may be determined from the material storage association information. When it is necessary to store a material, a material box or a rack that may store the material to be stored is determined based on SKU information of the material. For example, an ordinary material is stored in the material box and a large material is stored on the rack.

In another embodiment of the present application, the type of rack for storing the material to be fetched and placed may be determined according to material fetching information. For example, the type of the rack storing the material may be directly determined based on the SKU information. For example, if a material to be placed is a pendant material, a type of a rack for storing the pendant material may be directly determined to be the first portable rack based on the material fetching information, thus the pendant rack is added on a free first portable rack. In addition, if the type of the rack cannot be determined directly based on the material fetching information, the type of the rack where the material to be fetched is located may be determined in combination with the material storage association information. For example, if a piece of ordinary material is to be fetched according to a material fetching order, the ordinary material may be stored in a material box on the first fixed rack or a material box on the second fixed rack of the combined rack. Then, a plurality of material boxes that may store the ordinary material may be determined based on SKU of the order, and when a specific material box is chosen from the plurality of material boxes, it may be determined according to the material storage association information.

S97, selecting, based on the type of the rack, a warehousing robot for material fetching from the first warehousing robot and the second warehousing robot.

In the embodiment of the present application, different types of racks correspond to different warehousing robots, where the first fixed rack and the second fixed rack correspond to the first warehousing robot, and the first portable rack and the second portable rack correspond to the second warehousing robot.

In other embodiments of the present application, when there are different types of racks, types of racks are different, and the methods for determining the warehousing robot are also different.

When the type of the rack is the combined rack, a first scheduling instruction is sent to instruct the first warehousing robot to move to the second fixed rack in the combined rack where the material to be fetched is located, and fetch a material box where the material to be fetched is located from the corresponding second fixed rack to realize material fetching; or a second scheduling instruction is sent to instruct the second warehousing robot to move to the second portable rack in the combined rack where the material to be fetched is located, and move the corresponding second portable rack to realize material fetching.

When the type of the rack includes the combined rack and the first portable rack, the first portable rack is located at an aisle entrance, and the type of the material to be fetched includes a first ordinary material, a second ordinary material, a large material or a pendant material, when the material to be fetched is the second ordinary material, the large material or the pendant material: if the rack storing the material to be fetched and placed is the second portable rack of the combined rack, the second warehousing robot is instructed to fetch the material; and when the material to be fetched is the first ordinary material; and if the rack storing the material to be fetched and placed is the second portable rack of the combined rack, the first warehousing robot is instructed to fetch a material box storing the material to be fetched from the second fixed rack of the combined rack, and store the material box to the first portable rack at the lane entrance. When it is necessary to move the first portable rack at the aisle entrance, a second scheduling instruction is sent to instruct the second warehousing robot to move the first portable rack to a designated position.

When the type of the rack includes the first fixed rack and the first portable rack, and the first portable rack is located at an aisle entrance, a first scheduling instruction is sent to instruct the first warehousing robot to move to the first fixed rack where the material is located, fetch the material box where the material is located from the corresponding first fixed rack, and move the material box to the first portable rack at the aisle entrance. When it is necessary to move the first portable rack at the aisle entrance, a second scheduling instruction is sent to instruct the second warehousing robot to move the first portable rack to a designated position; or the second scheduling instruction is sent to instruct the second warehousing robot to move to the first portable rack where the material is located, and move the corresponding first portable rack to realize material fetching.

After the warehouse robot is determined, in order to further improve efficiency of material fetching, a traveling route of the warehouse robot may be planned. The embodiments of the present application are further explained in conjunction with FIG. 10.

Figure 10:
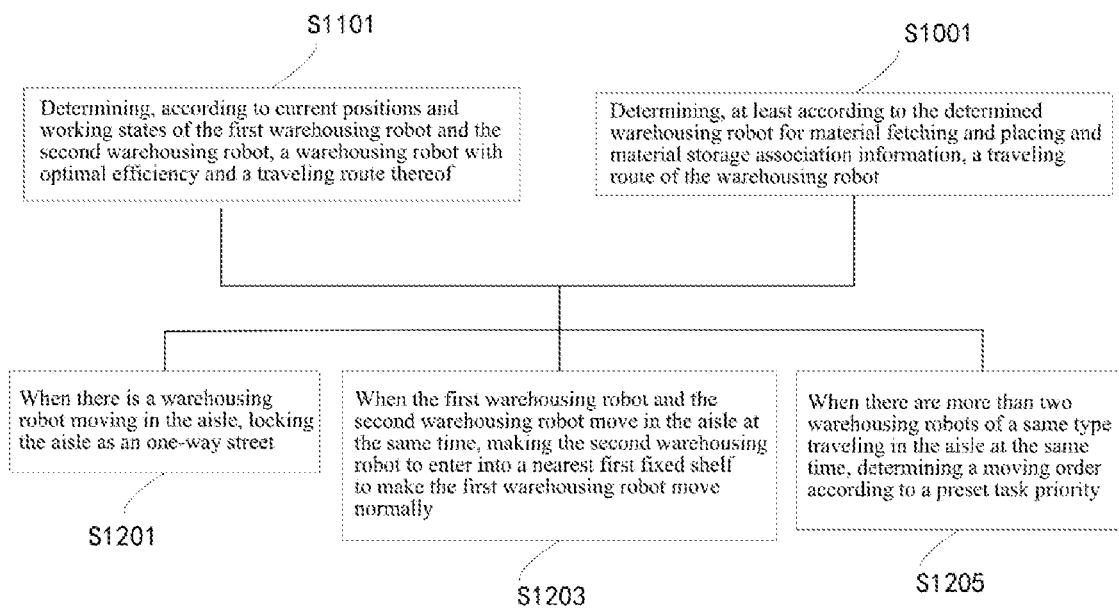
FIG. 10 is a flow diagram of a material fetching method provided by an embodiment of the present application.

As shown in FIG. 10, the material fetching methods described in the above embodiments of the present application may further include:

S1001, determining, at least based on the selected warehousing robot for material fetching and material storage association information, a traveling route for the warehousing robot.

In the embodiment of the present application, after the warehouse robot for material fetching is selected, in order to realize effective material fetching and avoid a traveling conflict between the warehouse robots, a rack or a material box with a shortest traveling route for the warehouse robot may be determined based on the material storage association position information, for example, positions of the rack or the material box. At the same time, after the traveling route is determined, whether there is a traveling conflict may be determined according to traveling routes of different warehousing robots. If there is a traveling conflict, an adjustment may be made again, such as by adjusting traveling speed of the warehousing robot or changing a traveling direction, etc.

It should be noted that the above method step may be applied to the above embodiments and performed after step S77, S87 or S97, respectively.

The material fetching method described in the above embodiment of the present application may further include:

S1101, selecting, based on current positions and working states of the first warehousing robot and the second warehousing robot, a warehousing robot that performs the fetching with optimal efficiency and has an optimal traveling route.

In the embodiment of the present application, in order to further reasonably plan a traveling route of the warehousing robot, a warehousing robot with optimal efficiency and a traveling route thereof may be selected in conjunction with a current position and a working state of the warehousing robot. Especially when there is a plurality of warehousing robots of a same type and materials to be fetched of a same type on a plurality of different positions at the same time in the warehousing system, current positions and working states of the warehousing robots may be used to select the warehousing robot with optimal efficiency, which may obviously improve efficiency of material fetching. For example, a free warehousing robot which is closer to a position of the material to be fetched may be chosen preferentially as the warehousing robot for material fetching.

It should be noted that the above method step may be applied to the above embodiments and may be performed after step S77, S87, S97 or S1001, respectively.

Where the traveling route of the above embodiment includes a main road and an aisle, and the method further includes:

S1201, when there is a warehousing robot moving in the aisle, locking the aisle as an one-way street, or, S1203, when the first warehousing robot and the second warehousing robot move in the aisle at the same time, making the second warehousing robot to enter into a nearest first fixed rack to make the first warehousing robot move normally, or, S1205, when there are more than two warehousing robots of a same type traveling in the aisle at the same time, determining a moving order according to a preset task priority.

It should be noted that the above steps may be applied to the above embodiments and performed after steps S1001 and s1101, respectively.

In the embodiment of the present application, when racks in the warehouse are deployed in a mixed way or regardless of region, the first warehousing robot and the second warehousing robot may first enter the aisle through the main road, and then travel from the aisle to a target rack. Alternatively, the second warehousing robot may directly take an optimal path from a bottom of the rack to enter a position of the target rack to fetch a material, and after fetching the material, enter the main road from the aisle to move the material to a corresponding processing area. After a robot enters the aisle, other robots may be prevented from entering the aisle to avoid congestion; or the aisle may not be locked down, and other robots may also enter the aisle. If other robots are allowed to enter the aisle, an obstacle avoidance setting of a traveling route may be preferentially performed. For example, when the second warehousing robot meets the first warehousing robot in the aisle, the second warehousing robot may first enter into a bottom of a nearest fixed rack to get out of the way to avoid collision. After a robot enters the aisle, the aisle may be turned into a one-way street to avoid congestion.

In another embodiment of the present application, when a path of the first warehousing robot is in the aisle and overlaps with a path of the second warehousing robot, if path directions of the two types of robots are the same, the two types of robots will move forward together. When the path of the second warehousing robot is longitudinal to the aisle, it may wait for the first warehousing robot to pass through just under a fixed rack to avoid collision.

In yet another embodiment of the present application, when two second warehousing robots meet in the aisle, if path directions of the two warehousing robots are the same, the two warehousing robots will move forward together; otherwise, priorities of the two second warehousing robots or positions where they can evade may be considered to make one of the second warehousing robots to evade under a rack.

It should be noted that since the above embodiment of the material fetching method is based on a same inventive concept as the intelligent warehousing system, corresponding contents and beneficial effects of the above embodiments of the intelligent warehousing system are also applicable to the embodiment of the material fetching method, which will not be described in detail here.

In the embodiment of the present application, by determining a traveling route of a warehousing robot in conjunction with material storage association information, a current position and working state of the warehousing robot, efficiency of material fetching and discharging is improved. At the same time, when there is a traveling conflict in traveling routes, an obstacle avoidance process is performed, so that fetching of the material is more scientific and reasonable.

Figure 11:
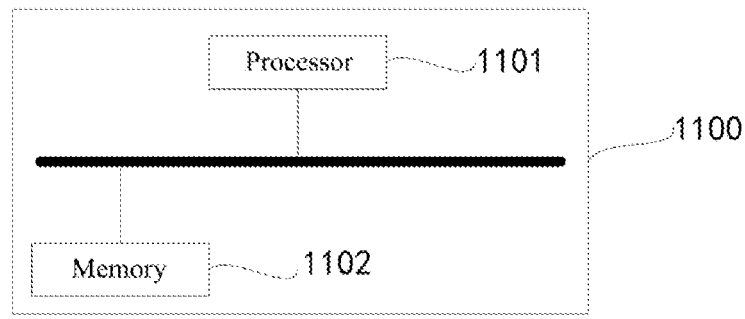
FIG. 11 is a schematic diagram of a processing terminal provided by an embodiment of the present application.

FIG. 11 is a structural diagram of a processing terminal provided by an embodiment of the present application. The processing terminal 1100 may be any type of electronic device, such as a background server, a computer device with processing capacity, a terminal device with computing function or scheduling function, etc., which may execute the material fetching method provided by a corresponding method embodiment.

Specifically, as shown in FIG. 11, the processing terminal 1100 includes:

at least one processor 1101 and a memory 1102 communicably connected with the at least one processor 1101, where one processor 1101 is taken as an example in FIG. 11.

The processor 1101 and the memory 1102 may be connected through a bus or by other means. In FIG. 11, a bus connection is taken as an example.

As a non-transitory computer readable storage medium, the memory 1102 may be configured to store a non-transitory software program and a non-transitory computer executable program, and a corresponding program may perform a corresponding step of a material fetching method (for example, the steps shown in FIG. 6 to FIG. 10). By running the non-transitory software program or instruction stored in the memory 1102, the processor 1101 executes a material fetching method, that is, the material fetching method described in any of the above corresponding method embodiments is realized.

The memory 1102 may include a storage program area and a storage data area, where the storage program area may store an application program required by an operating system and at least one function; and the storage data area may store data created by executing the above material fetching method, etc. In addition, the memory 1102 may include a high-speed random access memory, and may also include a non-transitory memory, for example, at least one disk storage device, a flash memory device, or other non-transitory solid-state storage device. In some embodiments, the memory 1102 may include a memory set remotely relative to the processor 1101, and the remote memory may be connected to the processing terminal 1100 through a network. Examples of the above network include but are not limited to the Internet, an intranet, a LAN, a mobile communication network, and combinations thereof.

The one or more modules are stored in the memory 1102, and when executed by the one or more processors 1101, execute the material fetching methods in the corresponding method embodiments, for example, execute the method steps S61 and S63 in FIG. 6, the method steps S71 to S77 in FIG. 7, the method steps S81 to S87 in FIG. 8, the method steps S91 to S97 in FIG. 9, the method steps S1001, S1101, S1201 to S1205 in FIG. 10, etc. described above.

The processing terminal 1100 may execute the material fetching methods in the above corresponding method embodiments, and has a corresponding device and beneficial effect of executing the methods. For technical details not described in detail in the material fetching method embodiments, reference please made to the descriptions in the above corresponding intelligent warehousing system embodiments.

An embodiment of the present application further provides a non-transitory computer readable storage medium, the non-transitory computer readable storage medium stores a computer executable instruction, and the computer executable instruction is configured to enable a computer to execute the material fetching methods in the method embodiments. For example, the computer executable instruction, when executed by one or more processors, such as the processor 1101 in FIG. 11, may enable being the above one or more processors to execute the material fetching methods in the corresponding method embodiments. For example, functions of the method steps S61 and S63 in FIG. 6, the method steps S71 to S77 in FIG. 7, the method steps S81 to S87 in FIG. 8, the method steps S91 to S97 in FIG. 9, the method steps S1001, S1101, S1201 to S1205 in FIG. 10, etc. described above are implemented. The above one or more processors may be enabled to execute the material fetching methods in the corresponding method embodiments.

An embodiment of the present application further provides a computer program product. The computer program product includes a computer program stored on a non-transitory computer readable storage medium. The computer program includes a program instruction which, when being executed by a computer, enables the computer to execute the material fetching methods in the above method embodiments. For example, functions of the method steps S61 and S63 in FIG. 6, the method steps S71 to S77 in FIG. 7, the method steps S81 to S87 in FIG. 8, the method steps S91 to S97 in FIG. 9, the method steps S1001, S1101, S1201 to S1205 in FIG. 10, etc. described above are implemented.

Figure 12:
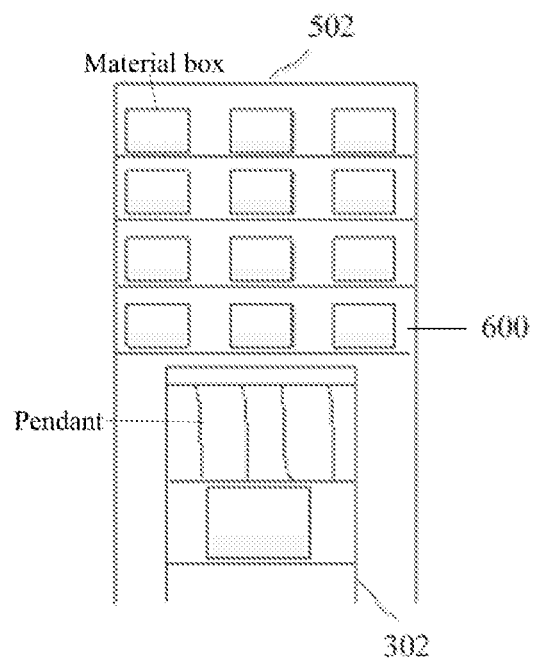
FIG. 12 is a structural diagram of a combined rack provided by an embodiment of the present application.

An embodiment of the present application further provides a combined rack, and as shown in FIG. 12, the combined rack 600 includes: a second fixed rack 502 and a second portable rack 302, the second portable rack 302 is located within a lower space of the second fixed rack 502. The second fixed rack 502 is configured to store a material box and/or a pallet, and the second portable rack 302 is configured to store a material, a material box, and/or a pallet. The material box is configured to store a material, and the pallet is configured to hold a material or a material box.

The material box stored in the second fixed rack 502 is moved by a first warehousing robot according to a first scheduling instruction.

The second portable rack 302 is moved by a second warehousing robot according to a second scheduling instruction.

There is one or more combined racks, and a plurality of combined racks are respectively located in different positions.

It should be noted that the fixed rack and the portable rack involved in the combined rack in the embodiment of the present application are based on a same concept as the fixed rack and the portable rack in the above intelligent warehousing system, and descriptions of the fixed rack and the portable rack in the intelligent warehousing system is also suitable for the present embodiment.

Apparatus or device embodiments described above are only schematic, where a unit module described as a separate component may or may not be physically separated, and a component displayed as a module unit may or may not be a physical unit, i.e., it may be located in one place or distributed to a plurality of network module units. Some or all of modules therein may be chosen according to an actual demand to achieve a purpose of the present embodiment.

Through the above descriptions of the embodiments, persons of skills in the art may clearly understand that the various embodiments may be implemented by means of software plus general hardware platform, and certainly, by means of hardware. Based on this understanding, essence of the above technical solutions or a part thereof which make a contribution to related technologies may be embodied in a form of a software product, and the computer software product may be stored in a computer readable storage medium, such as a ROM/ROM, a magnetic disk, an optical disk, etc., including a number of instructions which enables a computer device (probably a personal computer, a processing terminal, or a network device, etc.) to execute the methods described in the various embodiments or certain parts of the embodiments.

Finally, it should be noted that the above embodiments are only used to explain the technical solutions of the present application, not to limit them; under an idea of the present application, technical features in the above embodiments or different embodiments may further be combined; steps may be implemented in any order; and there are many other changes in different aspects of the present application described above, which are not provided in the details for the sake of simplicity. Although the present application has been explained in detail with reference to the embodiments, persons of skills in the art should understand that modifications may still be made on the technical solutions recited in the various embodiments, or equivalent substitutions may be made on a part of the technical features therein; and these modifications or substitutions will not make the essence of the corresponding technical solutions out of the scope of the technical solutions of the various embodiments in the present application.

The invention claimed is:

1. An intelligent warehousing system, comprising at least one first warehousing robot, at least one second warehousing robot, at least one fixed rack, and at least one portable rack,
wherein the at least one fixed rack is configured to store a first material box, and the first material box is configured to store a first material; and
the at least one portable rack is configured to store a second material, and each of the at least one portable rack is located at an aisle entrance;
wherein the at least one first warehousing robot is configured to receive a first scheduling instruction, move to the at least one fixed rack to fetch the first material box according to the first scheduling instruction, move the first material box to the aisle entrance, and place the first material box to the first portable tack at the aisle entrance; and
the at least one second warehousing robot is configured to receive a second scheduling instruction when the portable rack is full or the portable rack needs to move, move to the portable rack where the first material box is located according to the second scheduling instruction, and move the portable rack to a position located on a material sorting platform.

2. The warehousing system according to claim 1, wherein the at least one fixed rack is further configured to store a first pallet, wherein the first pallet is configured to hold a third material or a third material box storing a fourth material;
the at least one portable rack is further configured to store a fourth material box storing a fifth material or a second pallet, wherein the second pallet is configured to hold a sixth material or the fifth material box storing a seventh material.

3. The warehousing system according to claim 2, further comprising a processing station, wherein the processing station is provided with a put wall; the first target position and the second target position are located in a preset area of the processing station; and the first material in the first material box moved by the at least one first warehousing robot and the second material in the at least one portable rack moved by the at least one second warehousing robot are sorted at the processing station to places on the put wall that correspond to the first material and the second material.

4. The warehousing system according to claim 1, wherein each of the at least one first warehousing robot comprises a mobile chassis, a picking component, a lift component, and a storage rack, wherein the storage rack is configured to store the first material box that has been picked by the picking component from the at least one fixed rack.

5. The warehousing system according to claim 1, further comprising: a processing terminal,
wherein the processing terminal is configured to send at least one of the first scheduling instruction and the second scheduling instruction, the first scheduling instruction is used to instruct the at least one first warehousing robot to fetch the first material from the at least one fixed rack, and the second scheduling instruction is used to instruct the at least one second warehousing robot to move the at least one portable rack;
wherein the processing terminal stores material storage association information, and the material storage association information comprises at least one of the following information: material identification information, material box identification information, rack identification information, position information of a rack storing a material, position information of a material box storing a material, a corresponding relationship between racks and material boxes, a corresponding relationship between racks and materials, a corresponding relationship between material boxes and materials; and
wherein the processing terminal is specifically configured to:
obtain information of a material to be fetched, and determine a position of the material to be fetched according to the information of the material to be fetched and the material storage association information; send, according to the position of the material to be fetched, the first scheduling instruction to instruct the at least one first warehousing robot to move to the at least one fixed rack to fetch the material to be fetched; or, send the second scheduling instruction to instruct the at least one second warehousing robot to move to the at least one portable rack to fetch the material to be fetched.

6. A material fetching and placing method, applied to a processing terminal to be used in an intelligent warehousing system, wherein the intelligent warehousing system comprises at least one first warehousing robot, at least one second warehousing robot, at least one fixed rack, at least one portable rack,
wherein the at least one fixed rack is configured to store a first material box, and the first material box is configured to store a first material; and
the at least one portable rack is configured to store a second material, and each of the at least one portable rack is located at an aisle entrance; and
the method comprises:
obtaining information of a material to be fetched; and
performing, according to the information of the material to be fetched, at least one of following operations:
sending a first scheduling instruction to instruct the at least one first warehousing robot to move to the at least one fixed rack to fetch the first material box, move the first material box to the entrance, and pace the first material box to the first portable rack at the aisle entrance; and, sending, when the portable rack is full or the portable rack needs to move, a second scheduling instruction to instruct the at least one second warehousing robot to move to the portable rack where the first material box is located, and move the portable rack to a position located on a material sorting platform.

7. The method according to claim 6, further comprising:
storing material storage association information,
wherein the material storage association information comprises at least one of the following information:
material identification information, material box identification information, rack identification information, position information of a rack storing a material, position information of a material box storing a material, a corresponding relationship between racks and material boxes, a corresponding relationship between racks and materials, a corresponding relationship between material boxes and materials.

8. The method according to claim 7, further comprising:
determining, according to the information of the material to be fetched, a container storing the material to be fetched, wherein the container is at least one of: the first material box stored on the at least one fixed rack, a fourth material box stored on the at least one portable rack; and
when the container is the first material box stored on the at least one fixed rack, determining the first warehousing robot for material fetching and placing; or when the container is the fourth material box stored on the at least one portable rack, determining the second warehousing robot for material fetching and placing.

9. The method according to claim 8, wherein,
the information of the material to be fetched comprises: order information of the material to be fetched, and
the determining, according to the information of the material to be fetched, the container storing the material to be fetched comprising: determining, according to the order information of the material to be fetched and the material storage association information, the container where the material to be fetched is located.

10. The method according to claim 7, further comprising:
determining, according to the information of the material to be fetched, a type of the material to be fetched and placed, wherein the type of the material to be fetched comprises at least one of: a first ordinary material, a second ordinary material, a large material and a pendant material, wherein the first ordinary material is a material stored on the at least one fixed rack, and the second ordinary material, the large material and the pendant material are materials stored on the at least one portable rack; and
when the material to be fetched is a first ordinary material, determining the first warehousing robot for material fetching and placing; or
when the material to be fetched is a second ordinary material, a large material or a pendant material, determining the second warehousing robot for material fetching and placing.

11. A processing terminal, comprising:
at least one processor; and,
a memory, communicably connected with the at least one processor; wherein,
the memory stores an instruction executable by the at least one processor, and the instruction is executed by the at least one processor to enable the at least one processor to:
obtain information of a material to be fetched; and
send, according to the information of the material to be fetched, a first scheduling instruction to instruct the at least one first warehousing robot to move to the at least one fixed rack to fetch the first material box, move the first material box to the entrance, and place the first material box to the first portable rack at the aisle entrance; and
send, when the portable rack is full or the portable rack needs to move, a second scheduling instruction to instruct the at least one second warehousing robot to move to the portable rack where the first material box is located, and move the portable rack to a position located on material sorting platform.

12. The warehousing system according to claim 1, further comprises a movable rack;
wherein the fixed rack comprises a first fixed rack and a second fixed rack; and
wherein the movable rack is located within a lower space of the second fixed rack to form a combined rack.

13. The warehousing system according to claim 12, wherein the first fixed rack, the portable rack, and the combined rack are respectively located at different positions.

* * * * *